US010971747B2

(12) United States Patent
Nakajima et al.

(10) Patent No.: US 10,971,747 B2
(45) Date of Patent: Apr. 6, 2021

(54) FUEL CELL SYSTEM AND FUEL CELL CONTROL PROGRAM

(71) Applicant: Tokyo Gas Co. Ltd., Tokyo (JP)

(72) Inventors: Tatsuya Nakajima, Tokyo (JP); Shumpei Taku, Tokyo (JP); Kazuki Isshiki, Tokyo (JP)

(73) Assignee: TOKYO GAS CO., LTD., Tokyo (JP)

( * ) Notice: Subject to any disclaimer, the term of this patent is extended or adjusted under 35 U.S.C. 154(b) by 19 days.

(21) Appl. No.: 16/492,565

(22) PCT Filed: Mar. 1, 2018

(86) PCT No.: PCT/JP2018/007835
§ 371 (c)(1),
(2) Date: Sep. 9, 2019

(87) PCT Pub. No.: WO2018/163964
PCT Pub. Date: Sep. 13, 2018

(65) Prior Publication Data
US 2020/0044270 A1    Feb. 6, 2020

(30) Foreign Application Priority Data

Mar. 10, 2017   (JP) .............................. JP2017-046685

(51) Int. Cl.
*H01M 8/04858* (2016.01)
*H01M 8/04089* (2016.01)
*H01M 8/2465* (2016.01)

(52) U.S. Cl.
CPC ... *H01M 8/04925* (2013.01); *H01M 8/04097* (2013.01); *H01M 8/04865* (2013.01); *H01M 8/04895* (2013.01); *H01M 8/2465* (2013.01)

(58) Field of Classification Search
CPC ......... H01M 8/04925; H01M 8/04097; H01M 8/04865; H01M 8/04895; H01M 8/2465;
(Continued)

(56) References Cited

U.S. PATENT DOCUMENTS

2004/0166387 A1   8/2004 Imamura et al.
2007/0184315 A1   8/2007 Kelly et al.
(Continued)

FOREIGN PATENT DOCUMENTS

JP   2009-026529   2/2009
JP   2009-43520    2/2009
(Continued)

OTHER PUBLICATIONS

International Search Report and English Translation Thereof, PCT/JP2018/007835, 10 pages.
(Continued)

*Primary Examiner* — Stewart A Fraser
(74) *Attorney, Agent, or Firm* — Dority & Manning, P.A.

(57) ABSTRACT

A fuel cell system that includes a first fuel cell that generates electric power using a hydrogen-containing fuel gas; a second fuel cell that generates electric power using off-gas exhausted from the first fuel cell and containing hydrogen that has not reacted in the first fuel cell; a first control device that controls the electric power output from the first fuel cell by adjusting a current or a voltage being output from the first fuel cell; a second control device that controls the electric power output from the second fuel cell by adjusting a current or a voltage being output from the second fuel cell; and an output control device that controls at least one of the first control device or the second control device such that a total electric power being generated by the first fuel cell and the second fuel cell approaches an electric power demand.

14 Claims, 17 Drawing Sheets

(58) Field of Classification Search
CPC . H01M 8/0488; H01M 8/0491; H01M 8/0494
See application file for complete search history.

(56) References Cited

U.S. PATENT DOCUMENTS

| | | | |
|---|---|---|---|
| 2010/0136379 A1* | 6/2010 | King | H01M 8/04619 429/432 |
| 2015/0162625 A1* | 6/2015 | Cheatham, III | H01M 8/04619 429/430 |
| 2018/0248210 A1 | 8/2018 | Yaguchi | |

FOREIGN PATENT DOCUMENTS

| | | |
|---|---|---|
| JP | 2009-291054 | 12/2009 |
| JP | 2012-134031 | 7/2012 |
| JP | 2013-161602 | 8/2013 |
| JP | 2013258004 A | 12/2013 |
| JP | 2014-182884 | 9/2014 |
| JP | 2016-115495 | 6/2016 |
| JP | 2016-134287 | 7/2016 |
| JP | 2017-033665 | 2/2017 |
| WO | WO 2017037938 A1 | 3/2017 |

OTHER PUBLICATIONS

Extended European search report for European Patent Application No. 18764402.6 dated Nov. 19, 2020 (8 pages).

* cited by examiner

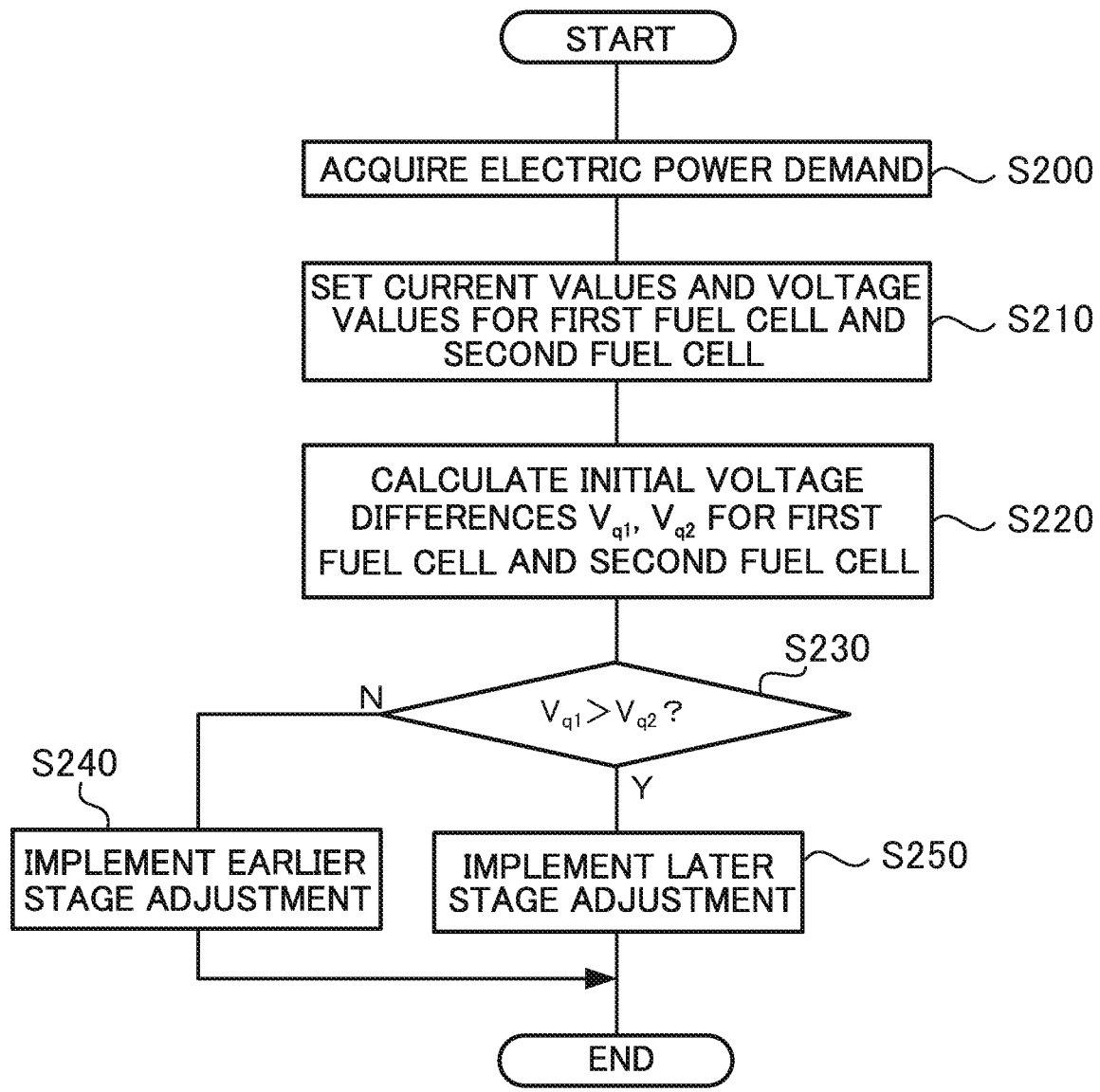

FUEL CELL SYSTEM AND FUEL CELL CONTROL PROGRAM

TECHNICAL FIELD

The present disclosure relates to a fuel cell system and a fuel cell control program. More specifically, the present disclosure relates to a fuel cell system and a fuel cell control program configured to control a power generation amount of a fuel cell.

Background Art

Proposals have been made for multistage fuel cells as methods for improving the fuel utilization rate in order to increase the efficiency of fuel cell systems.

Namely, this is technology in which plural fuel cells are employed. Anode off-gas including unreacted fuel gas from an earlier stage fuel cell is utilized in a later stage fuel cell.

In multistage fuel cell systems, regenerated fuel gas configured by removing water vapor and carbon dioxide from anode off-gas and increasing the concentration of fuel gas that contributes to a reaction (namely hydrogen and carbon monoxide) can be employed to perform further power generation in a later stage fuel cell. This enables the fuel utilization rate to be set higher than in cases in which power is generated employing a single fuel cell (see, for example, Japanese Patent Application Laid-Open (JP-A) No. 2016-115495).

SUMMARY OF INVENTION

Technical Problem

However, in multistage fuel cell systems, there has been insufficient research into how to control the output of the fuel cells in each stage in order to suppress fuel cell degradation accompanying power generation and improve power generation efficiency in response to electric power demand fluctuations (load fluctuations) in the load receiving electric power supplied from the multistage fuel cell systems.

In consideration of the above circumstances, an object of the present disclosure is to provide a multistage fuel cell system that controls output of plural fuel cells in response to load fluctuations.

Solution to Problem

In order to realize the above object, a fuel cell system of a first aspect includes a first fuel cell that generates electric power using a hydrogen-containing fuel gas; a second fuel cell that generates electric power using off-gas exhausted from the first fuel cell and containing hydrogen that has not reacted in the first fuel cell; a first control device that controls the electric power output from the first fuel cell by adjusting a current or a voltage being output from the first fuel cell; a second control device that controls the electric power output from the second fuel cell by adjusting a current or a voltage being output from the second fuel cell; and an output control device that controls at least one of the first control device or the second control device such that a total electric power being generated by the first fuel cell and the second fuel cell approaches an electric power demand.

A fuel cell system of a second aspect includes a first fuel cell that generates electric power using a hydrogen-containing fuel gas; a second fuel cell that generates electric power using off-gas exhausted from the first fuel cell and containing hydrogen that has not reacted in the first fuel cell; a control device that controls electric power output from the first fuel cell and the second fuel cell by adjusting a current or a voltage being output from the first fuel cell and the second fuel cell with the first fuel cell and the second fuel cell connected together in series; and an output control device that controls the control device such that a total electric power being generated by the first fuel cell and the second fuel cell approaches an electric power demand.

A fuel cell control program of a third aspect is configured to cause a computer to execute processing. The processing includes controlling electric power being output from a first fuel cell that generates electric power using a hydrogen-containing fuel gas by adjusting a current or a voltage being output from the first fuel cell; controlling electric power output from a second fuel cell that generates electric power using off-gas exhausted from the first fuel cell and containing hydrogen that has not reacted in the first fuel cell by adjusting a current or a voltage being output from the second fuel cell; and controlling such that a total electric power being generated by the first fuel cell and the second fuel cell approaches an electric power demand.

A fuel cell control program of a fourth aspect is configured to cause a computer to execute processing. The processing includes controlling electric power output from a first fuel cell that generates electric power using a hydrogen-containing fuel gas and controlling electric power output from a second fuel cell that is electrically connected in series with the first fuel cell and that generates electric power using off-gas exhausted from the first fuel cell and containing hydrogen that has not reacted in the first fuel cell, the electric power output from the first fuel cell and the second fuel cell being controlled by adjusting a current or a voltage output from the first fuel cell and the second fuel cell; and controlling such that a total electric power being generated by the first fuel cell and the second fuel cell approaches an electric power demand.

Advantageous Effects of Invention

The multistage fuel cell system of the present disclosure enables the output of plural fuel cells to be controlled in response to load fluctuations.

BRIEF DESCRIPTION OF DRAWINGS

FIG. 17 is a flowchart illustrating an example of a flow of multistage fuel cell control processing according to the eighth exemplary embodiment.

DESCRIPTION OF EMBODIMENTS

Figure 1:
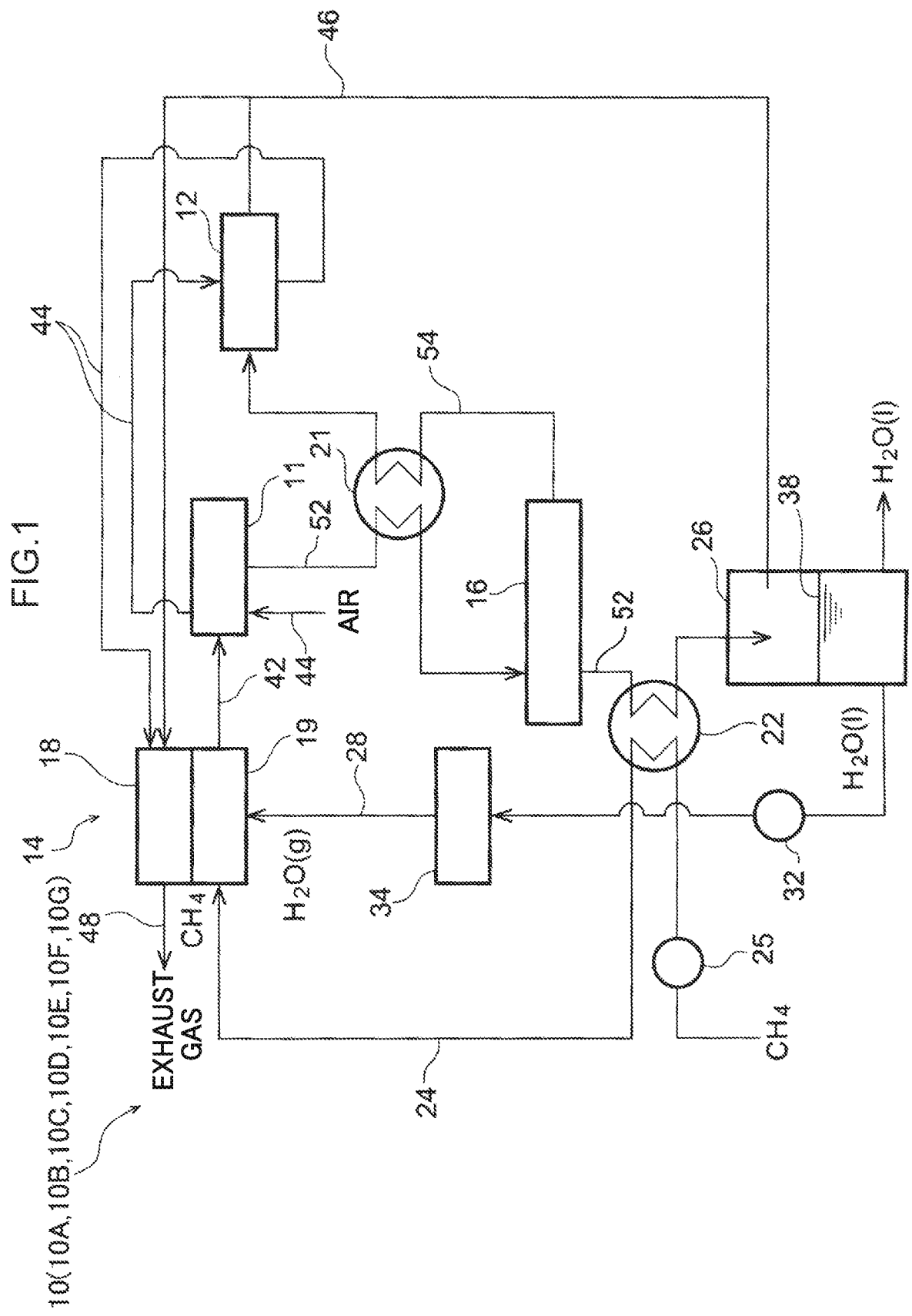
FIG. 1 is a diagram illustrating an example of configuration of a multistage fuel cell system.

Explanation follows regarding exemplary embodiments of the present disclosure, with reference to the drawings. Members and processing with the same functionality are allocated the same reference numerals throughout the drawings, and duplicate explanation thereof is omitted where appropriate.

First Exemplary Embodiment

A multistage fuel cell system 10 according to the present exemplary embodiment illustrated in FIG. 1 includes a fuel processing device 14, a first fuel cell 11, a water vapor separation film 16, and a second fuel cell 12.

The fuel processing device 14 is a Fuel Processing System (FPS) that generates hydrogen-containing fuel gas from a source gas such as methane. The fuel processing device 14 includes a catalyst and a combustion unit 18 to heat the catalyst. The catalyst is a reforming catalyst, and is provided inside a reforming unit 19. A source gas path 24 is connected to the reforming unit 19, and the source gas is supplied through the source gas path 24. A blower 25 is provided to the source gas path 24 to convey the source gas. A second heat exchanger 22, described later, is provided on the source gas path 24 between the blower 25 and the reforming unit 19, and the source gas is heated by the second heat exchanger 22.

A water supply path 28 is connected to the reforming unit 19, and the water supply path 28 is connected to a water tank 26. The water tank 26 is a vessel that collects water 38 condensed from water vapor removed by the water vapor separation film 16. A pump 32 and an evaporator 34, for example, are provided to the water supply path 28. The pump 32 feeds the water 38 in the water tank 26 to the water supply path 28. The evaporator 34 is provided downstream of the pump 32, and generates water vapor by evaporating the water 38 fed into the water supply path 28. The reforming unit 19 uses the water vapor supplied through the water supply path 28 to reform the source gas and thus generate a hydrogen-containing fuel gas. Namely, the fuel processing device 14 generates fuel gas by reforming the source gas using the water vapor removed by the water vapor separation film 16. The fuel gas is then supplied to an anode of the first fuel cell 11 through a fuel gas path 42.

An air supply path 44 and an off-gas path 46 are connected to the combustion unit 18 of the fuel processing device 14. The combustion unit 18 combusts a gas mixture of air supplied through the air supply path 44 and burner gas (corresponding to the off-gas described later) supplied through the off-gas path 46, and heats the catalyst inside the reforming unit 19. Exhaust from the combustion unit 18 is exhausted through an exhaust path 48.

The first fuel cell 11 is a fuel cell that generates electric power upstream of the combustion unit 18 using fuel gas supplied through the fuel processing device 14. The first fuel cell 11 is for example, a high-temperature solid oxide fuel cell that operates at around 750° C. The first fuel cell 11 includes an electrolyte layer, and an anode and a cathode respectively stacked on front and rear faces of the electrolyte layer. The anode is a fuel electrode, and the cathode is an air electrode.

Air (oxidizing gas) is supplied to the cathode through the air supply path 44. Oxygen and electrons react electrochemically with the electrolyte layer at the cathode to form oxygen ions, which move through the electrolyte film.

Hydrogen-containing fuel gas is supplied to the anode from the fuel processing device 14 through the fuel gas path 42. The hydrogen reacts at the anode with the oxygen ions that have moved through the electrolyte layer to generate water, carbon dioxide, and electrons. The electrons generated at the anode move to the cathode through an external circuit.

The first fuel cell 11 generates electric power due to the electrons moving from the anode to the cathode in this manner. Unreacted gas and gas generated at the cathode are supplied to the second fuel cell 12 through the downstream air supply path 44.

The water vapor separation film 16 removes water vapor in a vaporous state from the off-gas (anode off-gas) that contains fuel gas that has not reacted and generated gas from the first fuel cell 11 after being exhausted from the first fuel cell 11. The water vapor separation film 16 is provided on an off-gas path 52, and is capable of removing water vapor from the off-gas at a temperature higher than the condensation point of water (for example at 100° C. or higher).

Regenerated fuel gas obtained by removing water vapor from the off-gas is supplied to the second fuel cell 12 through a regenerated fuel gas path 54. A first heat exchanger 21 is provided on the regenerated fuel gas path 54. The first heat exchanger 21 performs heat exchange between the off-gas flowing through the off-gas path 52 and the regenerated fuel gas flowing through the regenerated fuel gas path 54 such that the off-gas is cooled to, for example, around 200° C., and the regenerated fuel gas is reheated so as to correspond to the operating temperature of the second fuel cell 12.

The water vapor removed by the water vapor separation film 16 is cooled by the second heat exchanger 22 and becomes the water 38, which is collected in the water tank 26. The off-gas path 46 is connected to an upper portion of the water tank 26. Gases such as carbon dioxide, which do not condense in the water tank 26, are supplied to the combustion unit 18 of the fuel processing device 14 through the off-gas path 46. The second heat exchanger 22 performs heat exchange between the source gas flowing through the source gas path 24 and the off-gas flowing through the off-gas path 52 to cool the off-gas and heat the source gas.

Another heat exchanger may be provided to perform heat exchange between air or water vapor and the off-gas. Namely, in the present exemplary embodiment, a heat exchanger performs heat exchange between the off-gas and at least one out of the regenerated fuel gas, source gas, air, water vapor, or the water 38 condensed from water vapor.

The second fuel cell 12 is a fuel cell that employs regenerated fuel gas to generate electric power. The second fuel cell 12 is, for example, a solid oxide fuel cell (SOFC) that operates at a high temperature of around 750° C. Similarly to the first fuel cell 11, the second fuel cell 12 includes an electrolyte layer, and an anode and a cathode respectively stacked on front and rear faces of the electrolyte layer. The anode is supplied with regenerated fuel gas through the regenerated fuel gas path 54.

The configuration of the second fuel cell 12 is similar to that of the first fuel cell 11, and employs regenerated fuel gas to generate electric power. Unreacted gas and gas generated at the cathode is supplied to the combustion unit 18 of the fuel processing device 14 through the downstream air supply path 44.

Although explanation has been given regarding an example in which the second fuel cell 12 employs regenerated fuel gas to generate electric power, the second fuel cell 12 does not necessarily have to employ regenerated fuel gas to generate electric power, and may employ off-gas exhausted from the first fuel cell 11.

The first fuel cell 11 and the second fuel cell 12 are each configured by a fuel cell stack including plural cells that each generate electric power. Since the voltage generated by a single cell is around 0.7 V, the maximum output voltage of the first fuel cell 11 and the second fuel cell 12 is determined by the number of cells connected in series. The first fuel cell 11 and the second fuel cell 12 are each configured by at least one fuel cell stack.

The electric power generated by the multistage fuel cell system 10 is, for example, input to an incoming power panel 50. The electric power generated by the multistage fuel cell system 10 is supplied to a load after performing system coordination at the incoming power panel 50 to coordinate with grid power supplied by an electric power provider according to a supply-and-demand balance of electric power. Sometimes, for example, a designated amount of the electric power generated by the multistage fuel cell system 10 is back-fed into the electric power provider system through the incoming power panel 50 to be supplied to a load of a power user other than that where the multistage fuel cell system 10 is installed. The amount of back-fed power is, for example, designated by a separately provided power management center based on an overall demand for power across the electric power provider system. Explanation follows regarding an example in which the electric power generated by the multistage fuel cell system 10 is supplied to a load of the power user in which the multistage fuel cell system 10 is installed.

The incoming power panel 50 prioritizes supply of electric power generated by the multistage fuel cell system 10 over grid power to a load. Here, "load" is a collective term used for all devices and equipment that consume power to operate.

Since the first fuel cell 11 employs fuel gas supplied from the fuel processing device 14 to generate electric power, the first fuel cell 11 is an example of an earlier stage fuel cell, and since the second fuel cell 12 employs regenerated fuel gas regenerated from off-gas employed in the first fuel cell 11 including fuel gas that has not reacted in the first fuel cell 11 to generate electric power, the second fuel cell 12 is an example of a later stage fuel cell. Hereafter, the first fuel cell 11 and the second fuel cell 12 will be referred to simply as "fuel cells" when there is no need to distinguish therebetween.

Figure 2:
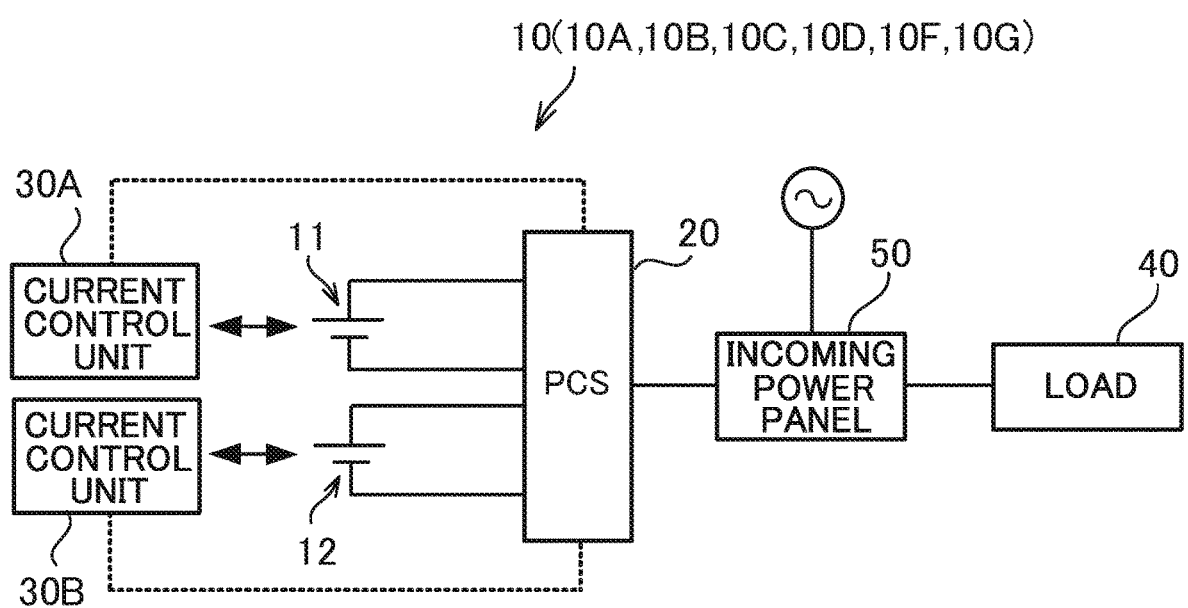
FIG. 2 is a schematic configuration diagram illustrating a control system of a multistage fuel cell system.

FIG. 2 schematically illustrates an example of a control system for controlling electric power being generated by the multistage fuel cell system 10. As illustrated in FIG. 2, output terminals of the first fuel cell 11 and the second fuel cell 12 of the multistage fuel cell system 10 are connected to a power conditioning system (PCS) 20.

Since the voltage generated by the first fuel cell 11 and the second fuel cell 12 corresponds to direct current, this is converted to alternating current by the PCS 20 before being supplied from the PCS 20 to a load 40 through the incoming power panel 50, for example. Note that in cases in which, for example, an input voltage to the load 40 corresponds to a direct current voltage, or in cases in which an external DC/AC convertor is provided separately to the multistage fuel cell system 10, the PCS 20 may supply the direct current voltage output by the first fuel cell 11 and the second fuel cell 12 directly to the exterior without being converted into alternating current voltage.

Generally, in cases in which power supply outstrips demand, the frequency of the power increases above a predetermined grid power frequency (50 Hz in the case of the East Japan region, 60 Hz in the case of the West Japan region) configuring the frequency when the power supply-and-demand balance is in equilibrium. In cases in which power supply falls short of demand, the frequency of the power decreases below the predetermined grid power frequency.

Accordingly, for example, the PCS 20 ascertains the electric power demand of the load 40 that fluctuates according to circumstances based on a fluctuation amount in the frequency of the electric power being supplied to the load 40. The PCS 20 then controls the electric power generation amounts of the first fuel cell 11 and second fuel cell 12 such that the electric power generated by the multistage fuel cell system 10 approaches the electric power demand of the load 40.

In more detail, the PCS 20 sets the electric power generated by the first fuel cell 11 and the electric power generated by the second fuel cell 12 such that the total electric power generated by the first fuel cell 11 and the second fuel cell 12 approaches the electric power demand of the load 40. The PCS 20 also calculates current values that should be output from the respective fuel cells in order to obtain the set electric power, namely the current values corresponding to the electric power generated by the first fuel cell 11 and the second fuel cell 12, for the first fuel cell 11 and the second fuel cell 12 individually. Hereafter, the amount of electric power being generated by the first fuel cell 11 and the second fuel cell 12 will be referred to as the "power generation amount".

The PCS 20 notifies a current control unit 30A that controls the power generation amount of the first fuel cell 11 of a current value (referred to hereafter as the "first current value") corresponding to the electric power being generated by the first fuel cell 11. The PCS 20 also notifies a current control unit 30B that controls the power generation amount of the second fuel cell 12 of a current value (referred to hereafter as the "second current value") corresponding to the electric power being generated by the second fuel cell 12.

When the current control unit 30A receives the first current value from the PCS 20, the current control unit 30A controls the first fuel cell 11 such that the magnitude of the current being output from the first fuel cell 11 approaches the first current value. When this is performed, the current control unit 30A may control an adjustment section configured by the blower 25, the pump 32, and the like to adjust the fuel gas flow rate if so required in order to control the current of the first fuel cell 11.

Similarly, when the current control unit 30B receives the second current value from the PCS 20, the current control unit 30B controls the second fuel cell 12 such that the magnitude of the current being output from the second fuel cell 12 approaches the second current value. When this is performed, similarly to the current control unit 30A, the current control unit 30B may control an adjustment section configured by the blower 25, the pump 32, and the like if so required in order to control the current of the second fuel cell 12.

Note that the adjustment sections that control the current control unit 30A and the current control unit 30B are not limited to the blower 25 and the pump 32. For example, instead of the blower 25 and the pump 32, or in addition to the blower 25 and the pump 32, an air blower and the like may be controlled so as to adjust a supply rate of air through the air supply path 44.

Note that the PCS 20 is an example of an output control device, the current control unit 30A is an example of a first control device, and the current control unit 30B is an example of a second control device.

Figure 3:
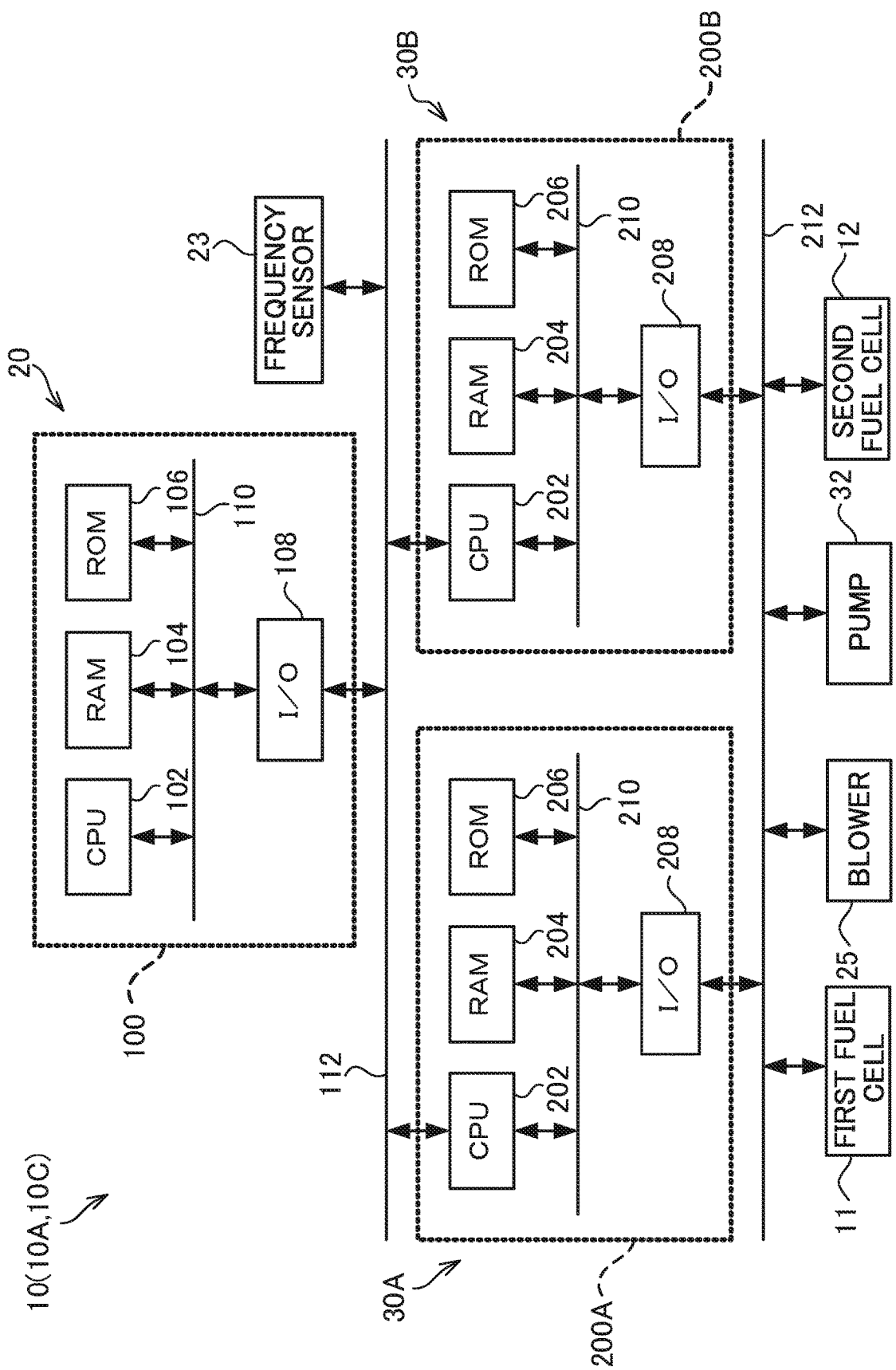
FIG. 3 is a diagram illustrating an example of configuration of a multistage fuel cell system according to a first exemplary embodiment, a second exemplary embodiment, and a fourth exemplary embodiment in a case in which control is performed using a computer.

The above-described control of the output of the fuel cells by the PCS 20 and the current control units 30A, 30B may, for example, be implemented using a computer. FIG. 3 is a diagram illustrating an example of configuration when computers 100, 200A, and 200B are employed to implement the functional sections relating to control of the PCS 20 and the current control units 30A, 30B of the multistage fuel cell system 10 by loading and executing a program from memory into a processor.

The computer 100 includes a central processing unit (CPU) 102 that performs program processing, random access memory (RAM) 104 employed as a work area and the like during execution of a program by the CPU 102, read only memory (ROM) 106 that is pre-stored with a program, various parameters, and the like, an I/O 108 configuring an interface connecting the computer 100 to external devices such as the computers 200A, 200B, and an internal bus 110. The CPU configures a hardware processor of the present disclosure.

The computer 100 implements control functionality of the PCS 20 to control the power generation amounts of the first fuel cell 11 and the second fuel cell 12 by forwarding various data between the CPU 102, the RAM 104, the ROM 106, and the I/O 108 connected to the internal bus 110.

The I/O 108 is connected through a first external bus 112 to a frequency sensor 23 that measures the frequency of the electric power supplied to the load 40, and the computers 200A, 200B.

Similarly to the computer 100, the computers 200A, 200B each include a CPU 202, RAM 204, ROM 206, an I/O 208, and an internal bus 210. The computers 200A, 200B forward various data between the CPU 202, the RAM 204, the ROM 206, and the I/O 208 that are connected to the internal bus 210 to implement the control functionality of the current control units 30A, 30B.

The I/O 208 is also connected to the first fuel cell 11, the second fuel cell 12, the blower 25, the pump 32, and the like through a second external bus 212.

The devices and so on connected to the I/O 108 and the I/O 208 are merely examples, and other devices and the like may also be connected thereto. For example, a communication line such as the internet or a dedicated line may be connected to at least one out of the I/O 108 or the I/O 208, and a communication device to communicate with other information processing terminals over the communication line may be connected thereto.

Alternatively, for example, an input device such as a touch panel or a display device such as a liquid crystal display may be connected to at least one out of the I/O 108 or the I/O 208.

Explanation follows regarding fuel cell output control performed by the multistage fuel cell system 10.

Figure 4:
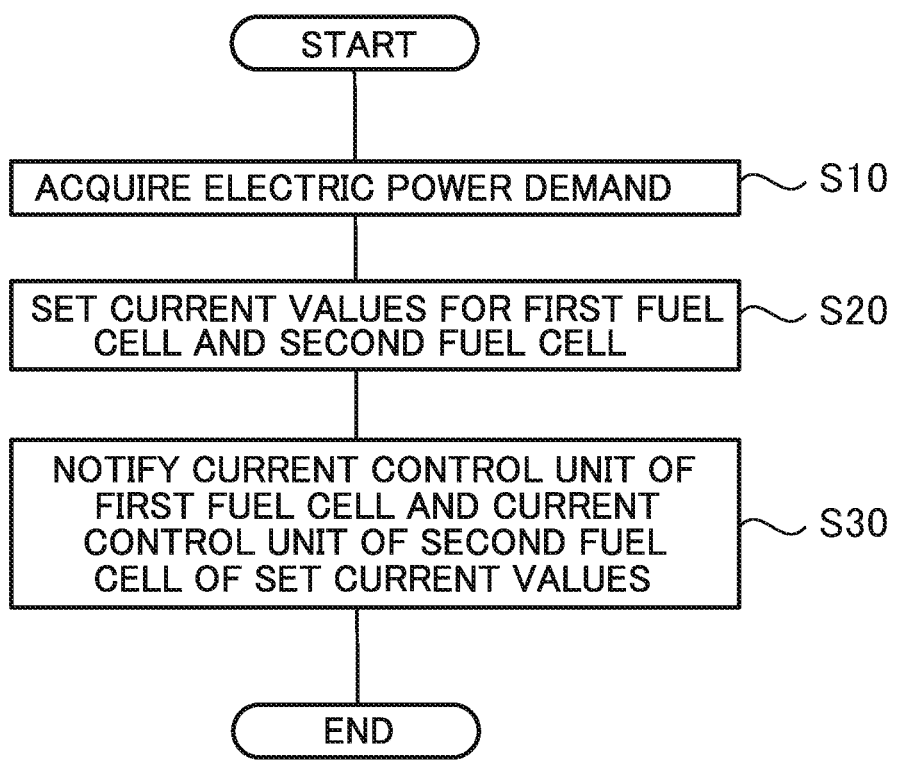
FIG. 4 is a flowchart illustrating an example of a flow of multistage fuel cell control processing according to the first exemplary embodiment.

FIG. 4 is a flowchart illustrating an example of a flow of multistage fuel cell control processing based on a multistage fuel cell control program executed by the CPU 102 of the PCS 20. The multistage fuel cell control program is stored in advance in the ROM 106, and the CPU 102 reads the multistage fuel cell control program from the ROM 106 and executes the multistage fuel cell control program. Here, the PCS 20 is understood to be in a state already supplying electric power generated by the fuel cells to the load 40.

First, at step S10, using the frequency sensor 23, the PCS 20 measures the frequency of the electric power being supplied to the load 40, and calculates the shift in the frequency, namely the frequency fluctuation amount, from the grid frequency (for example 50 Hz). The PCS 20 then calculates an electric power demand change amount of the load 40 from the calculated frequency fluctuation amount, and acquires the electric power demand of the load 40 from the magnitude of the present electric power supply to the load 40 and the electric power demand change amount of the load 40. The PCS 20 then stores the acquired electric power demand of the load 40, for example in the RAM 104.

A correspondence relationship between frequency fluctuation amounts and the electric power demand change amount of the load 40 may be derived in advance based on, for example, testing with an actual multistage fuel cell system 10 or computer simulations based on the design specifications of the multistage fuel cell system 10, and stored in a predetermined region of the ROM 106.

Although the electric power demand of the load 40 is acquired by measuring the frequency of the electric power supplied to the load 40 as an example, the electric power demand of the load 40 may be acquired by another method. For example, the power consumption of the load 40 measured by a power meter installed at the incoming power panel 50 that receives electric power supplied from the PCS 20 and grid power supplied from the electric power provider and distributes electric power to the load 40 may be acquired as the electric power demand of the load 40.

At step S20, the PCS 20 refers to a relationship between voltage and current of the fuel cells against pre-defined current-voltage characteristics, and determines the magnitudes of the currents to be output from the first fuel cell 11 and the second fuel cell 12 such that the total power generation amount of the first fuel cell 11 and the second fuel cell 12 approaches the electric power demand of the load 40 as acquired at step S10.

When this is performed, the PCS 20 sets the first current value and the second current value such that the currents output from the first fuel cell 11 and the second fuel cell 12 are of the same magnitude as each other, namely such that the first current value and the second current value become the same as each other.

Note that the voltages of the first fuel cell 11 and the second fuel cell 12 may be adjusted such that the total power generation amount of the first fuel cell 11 and the second fuel cell 12 approaches the electric power demand of the load 40 as acquired at step S10 and such that the magnitudes of the currents output from the first fuel cell 11 and the second fuel cell 12 become the same as each other. However, explanation follows regarding an example in which the currents are adjusted.

Figure 5:
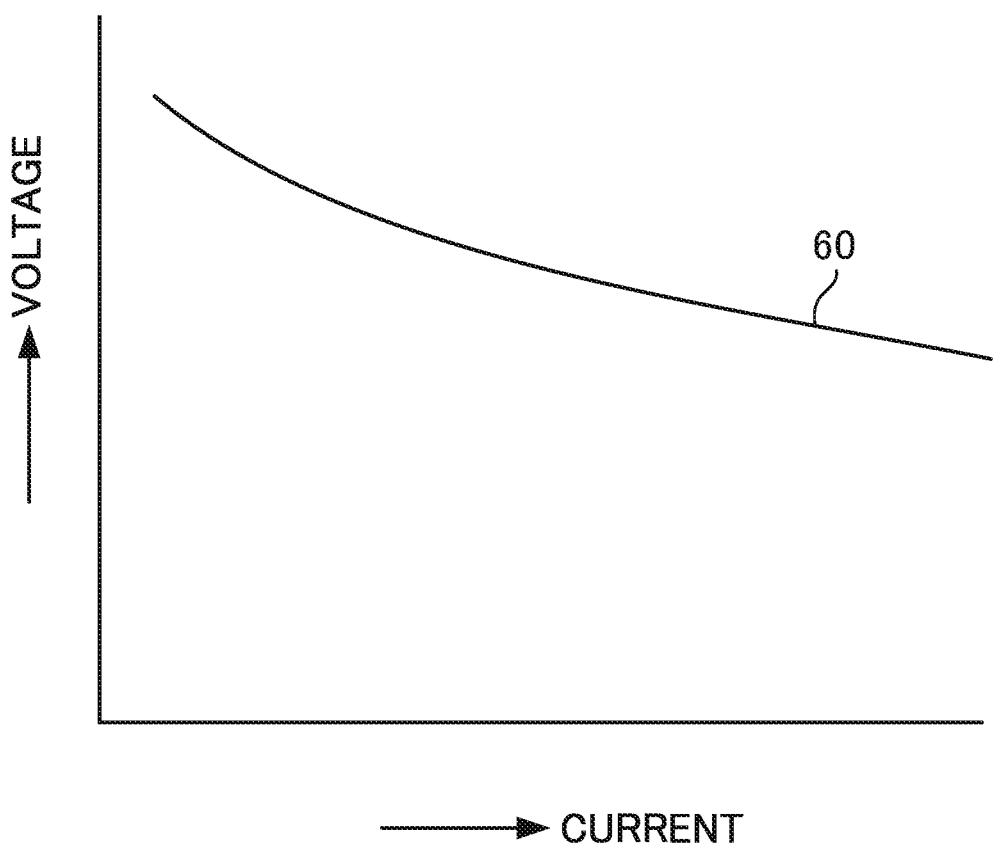
FIG. 5 is a graph illustrating an example of current-voltage characteristics of fuel cells.

FIG. 5 is a graph illustrating an example of current-voltage characteristics 60 of fuel cells. The vertical axis of the current-voltage characteristics 60 illustrated in FIG. 5 represents the voltage, and the horizontal axis represents the current. A trend of change in the voltage value output from the fuel cells accompanying change in the current value output from the fuel cells can be seen in the current-voltage characteristics 60 for the fuel cells. The current-voltage characteristics 60 for the fuel cells will differ depending on such factors as the characteristics of the electrolyte employed in the fuel cells.

Accordingly, the PCS 20 refers to the pre-defined current-voltage characteristics 60 for the first fuel cell 11 and the second fuel cell, and sets the first current value and the second current value such that the total power generation amount of the first fuel cell 11 and the second fuel cell 12 approaches the electric power demand of the load 40 as acquired at step S10 under the condition of the first current value and the second current value being the same as each other.

The current-voltage characteristics 60 of the first fuel cell 11 and the second fuel cell 12 may, for example, be derived in advance by testing using the actual first fuel cell 11 and second fuel cell 12, or by computer simulations based on the design specifications of the first fuel cell 11 and the second fuel cell 12, and then stored in a predetermined region of the ROM 106.

At step S30, the PCS 20 notifies the current control unit 30A through the I/O 108 of the first current value set at step S20, and notifies the current control unit 30B through the I/O 108 of the second current value set at step S20.

The above concludes the multistage fuel cell control processing illustrated in FIG. 4.

Figure 6:
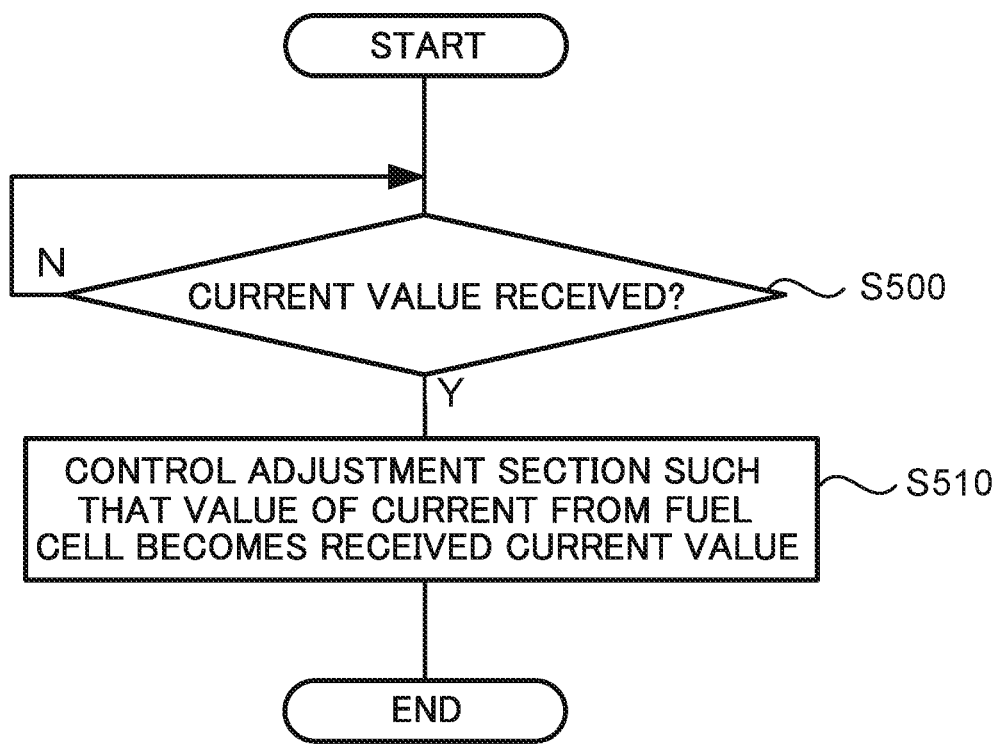
FIG. 6 is a flowchart illustrating an example of a flow of fuel cell control processing.

FIG. 6 is a flowchart illustrating an example of a flow of fuel cell control processing based on a fuel cell control program executed by the CPUs 202 included in the current control unit 30A and the current control unit 30B. The fuel cell control programs are stored in advance in the ROMs 206, and the each of the CPUs 202 reads the fuel cell control program from the corresponding ROM 206 and executes the fuel cell control program.

The current control unit 30A controls the first fuel cell 11, and the current control unit 30B controls the second fuel cell 12. Other than this, there is no difference between the processing executed by the current control unit 30A and the current control unit 30B, and so explanation follows regarding fuel cell control processing in the current control unit 30A as an example.

At step S500, the current control unit 30A determines whether or not a current value (in this case, the first current value) has been received from the PCS 20. When the determination processing of step S500 yields negative determination, the processing of step S500 is repeated until the first current value is received from the PCS 20. When the determination processing of step S500 yields affirmative determination, processing transitions to step S510.

At step S510, the current control unit 30A controls the first fuel cell 11 such that the magnitude of the current being output from the first fuel cell 11 approaches the first current value received at step S500.

When this is performed, the current control unit 30A may make the magnitude of the current being output from the first fuel cell 11 approach the first current value while measuring the magnitude of the current with an ammeter.

By the above processing, the total power generation amount of the first fuel cell 11 and the second fuel cell 12 is controlled so as to approach the electric power demand of the load 40.

The control method of the first exemplary embodiment, in which the power generation amounts of the first fuel cell 11 and the second fuel cell 12 are controlled individually such that a ratio of the current values of the first current value and the second current value does not vary, is sometimes referred to as "uniform adjustment".

In the multistage fuel cell system 10 according to the first exemplary embodiment, the power generation amounts of the first fuel cell 11 and the second fuel cell 12 are controlled individually in response to the electric power demand of the load 40. This enables control to be performed such that if either the first fuel cell 11 or the second fuel cell 12 has developed a fault, the fuel cell that is not faulty can be made to generate electric power to make up the electric power demand of the load 40 within a range not exceeding the rated output of the fuel cell. This enables electric power to be more stably supplied to the load 40 than in cases in which the power generation amount is only controlled for one out of the first fuel cell 11 or the second fuel cell 12.

In cases in which the ratio of the current values of the first fuel cell 11 and the second fuel cell 12 are set to 1:1, it becomes easier to align the temperatures of the first fuel cell 11 and the second fuel cell 12, such that degradation tends to occur at the same pace. This makes it easier to predict the lifespans of the first fuel cell 11 and the second fuel cell 12, thereby improving maintenance characteristics of the multistage fuel cell system 10.

Note that the ratio of the current values of the first fuel cell 11 and the second fuel cell 12 may be set to a ratio other than 1:1. For example, in cases in which the second fuel cell 12 has a higher voltage than the first fuel cell 11, setting the ratio of the current values such that the current value of the second fuel cell 12 is larger than the current value of the first fuel cell 11 enables the power generation efficiency of the multistage fuel cell system 10 to be raised.

Second Exemplary Embodiment

In the first exemplary embodiment, explanation has been given regarding the multistage fuel cell system 10 in which the power generation amounts of the first fuel cell 11 and the second fuel cell 12 are controlled in response to the electric power demand of the load 40. However, in a second exemplary embodiment, explanation is given regarding a multistage fuel cell system 10A in which the power generation amount of the first fuel cell 11, this being an example of an earlier stage fuel cell, is controlled so as to supply electric power in response to electric power demand of the load 40, while the power generation amount of the second fuel cell 12, this being an example of a later stage fuel cell, remains set at a predetermined value.

An outline configuration of the multistage fuel cell system 10A is the same as the outline configuration of the multistage fuel cell system 10 illustrated in FIG. 1. A control system of the multistage fuel cell system 10A is the same as the control system of the multistage fuel cell system 10 illustrated in FIG. 2. The multistage fuel cell system 10A loads and executes a program from memory into a processor, thereby enabling the computers 100, 200A, and 200B illustrated in FIG. 3 to be employed to implement functional sections relating to control of the PCS 20 and current control units 30A, 30B of the multistage fuel cell system 10A.

Explanation follows regarding output control of the fuel cells of the multistage fuel cell system 10A.

Figure 7:
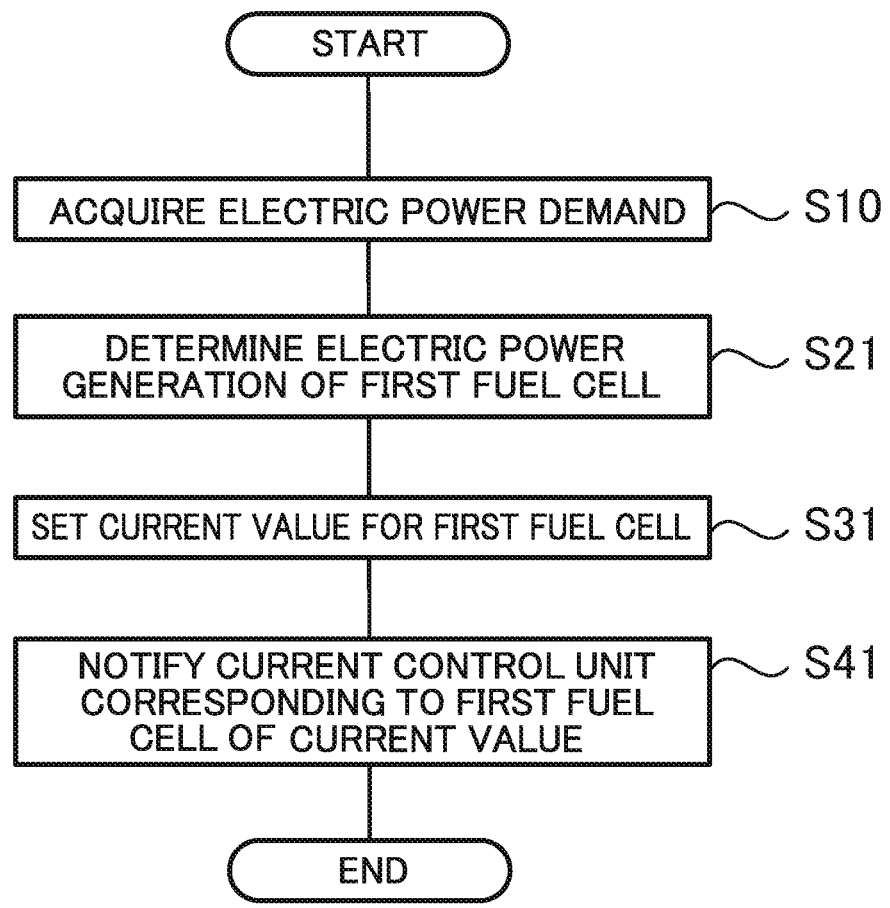
FIG. 7 is a flowchart illustrating an example of a flow of multistage fuel cell control processing according to the second exemplary embodiment.

FIG. 7 is a flowchart illustrating an example of a flow of multistage fuel cell control processing based on a multistage fuel cell control program executed by the CPU 102 included in the PCS 20 of the multistage fuel cell system 10A. The multistage fuel cell control program is stored in advance in the ROM 106, and the CPU 102 reads the multistage fuel cell control program from the ROM 106 and executes the multistage fuel cell control program. Here, the PCS 20 is understood to be in a state already supplying power generated by the fuel cells to the load 40. Specifically, the power generation amount of the second fuel cell 12 is set to a predetermined value. Note that the value of the predetermined power generation amount may be varied according to the magnitude of the load 40.

First, at step S10, the PCS 20 executes similar processing to that of step S10 in FIG. 4 to acquire the electric power demand of the load 40.

At step S21, the PCS 20 determines the electric power to be generated by the first fuel cell 11 from the electric power demand of the load 40 as acquired at step S10 and the predetermined power generation amount of the second fuel cell 12. The power generation amount of the second fuel cell 12 is set in advance in the multistage fuel cell system 10A, and is controlled such that the power generation amount of the second fuel cell 12 does not fluctuate.

To say that the power generation amount of the second fuel cell 12 is set in advance encompasses not only a situation in which the power generation amount of the second fuel cell 12 is fixed to a single power generation amount, but also situations in which some form of power generation amount has been set, for example a power generation amount that varies in response to the electric power demand of the load 40.

Accordingly, if the PCS 20 controls such that the first fuel cell 11 generates electric power matching the electric power demand of the load 40 as acquired at step S10 minus the predetermined power generation amount of the second fuel cell 12, the total power generation amount of the first fuel cell 11 and the second fuel cell 12 will match the electric power demand of the load 40.

At step S31, the PCS 20 refers to the pre-defined current-voltage characteristics 60 for the first fuel cell 11, and sets a current value at which the product of the voltage and the current becomes the electric power generated by the first fuel cell 11 determined at step S21, as the first current value.

At step S41, the PCS 20 notifies the current control unit 30A through the I/O 108 of the first current value set at step S31.

Subsequently, the current control unit 30A executes the fuel cell control processing illustrated in FIG. 6 to perform control such that the magnitude of the current being output from the first fuel cell 11 approaches the first current value.

Accordingly, electric power is supplied from the multistage fuel cell system 10A in response to the electric power demand of the load 40.

As already described above, in the multistage fuel cell system 10A the power generation amount of the second fuel cell 12 is controlled so as to become a predetermined value, for example the rated output of the second fuel cell 12. More specifically, the PCS 20 notifies the current control unit 30B of a second current value set with reference to the current-voltage characteristics 60 corresponding to the second fuel cell 12 such that the power generation amount of the second fuel cell 12 becomes a predetermined value. Note that since the second current value does not vary in the multistage fuel cell system 10A, it is sufficient for the current control unit 30B to be notified of the second current value a single time at the start of power generation.

Note that a control method such as that described in the second exemplary embodiment, in which the power generation amount of the first fuel cell 11 corresponding to an earlier stage fuel cell is controlled while the power generation amount of the second fuel cell 12 remains set at a predetermined value, is sometimes referred to as "earlier stage adjustment".

In the multistage fuel cell system 10A according to the second exemplary embodiment, since the power generation amount of the first fuel cell 11 is controlled while the power generation amount of the second fuel cell 12 remains set at a predetermined value, the fluctuation amount of the current being output from the second fuel cell 12 is smaller than the fluctuation amount of the current being output from the first fuel cell 11. Since fuel cell degradation can become more pronounced the greater the level of fluctuation in the current being output from the fuel cell, degradation of the second fuel cell 12 can be suppressed in comparison to cases in which control is performed to vary the power generation amount of the second fuel cell 12.

Moreover, since the rated output of a fuel cell is for example determined by the number of power generating cells connected in series, supposing the rated output of the first fuel cell 11 were greater than the rated output of the second fuel cell 12 when the rated output of the first fuel cell 11 and the rated output of the second fuel cell 12 are compared, it may be assumed that the first fuel cell 11 includes more power generating cells than the second fuel cell 12. Namely, the first fuel cell 11 enables the amount of electric power to be varied by changing the current by a smaller amount than would be required for the second fuel cell 12 to vary the amount of electric power by an equivalent amount.

Third Exemplary Embodiment

In the second exemplary embodiment, the first current value is set in response to the electric power demand of the load 40 with reference to the current-voltage characteristics 60 corresponding to the first fuel cell 11.

Figure 8:
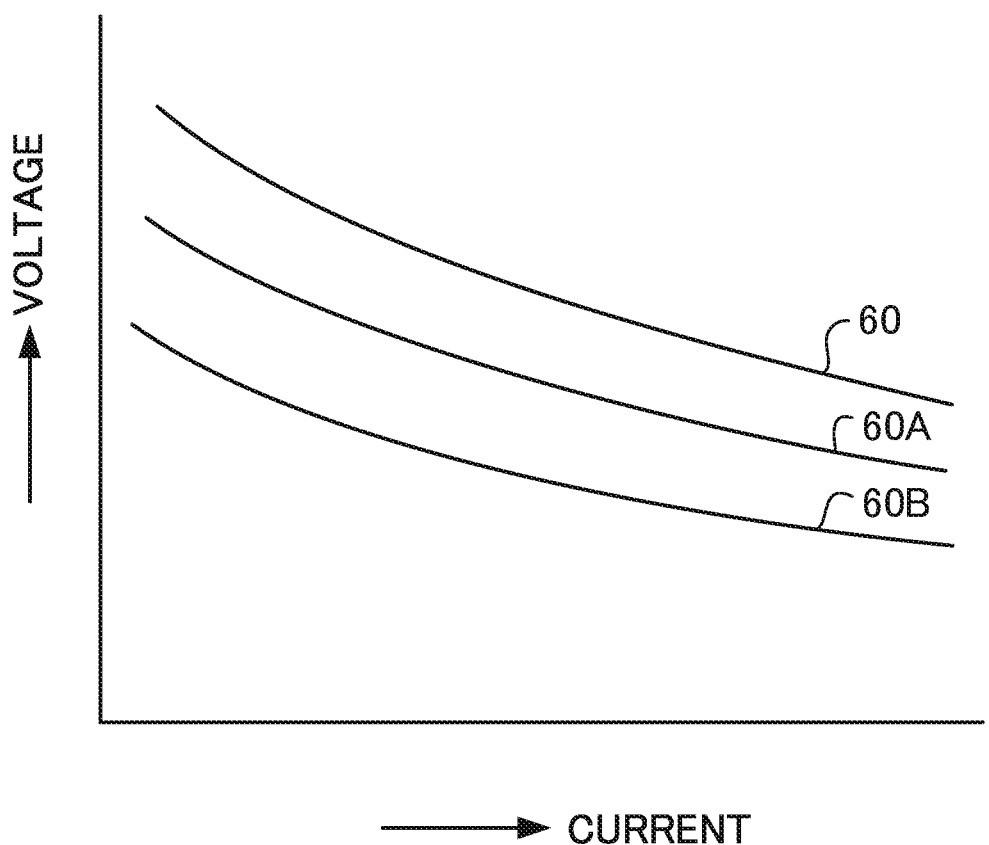
FIG. 8 is a diagram illustrating an example of fluctuations in current-voltage characteristics.

However, as illustrated in FIG. 8, as fuel cell degradation progresses, the current-voltage characteristics 60 evolve from the current-voltage characteristics 60 to current-voltage characteristics 60A to current-voltage characteristics 60B. The pre-defined current-voltage characteristics 60 of the fuel cells often differ from the actual current-voltage characteristics of the fuel cells when controlling the current.

Accordingly, in a third exemplary embodiment, explanation is given regarding a multistage fuel cell system 10B in which electric power is supplied in response to the electric power demand of the load 40 by controlling the power generation amount of the first fuel cell 11 while the power generation amount of the second fuel cell 12 remains set at a predetermined value, without employing the pre-defined current-voltage characteristics 60 of the fuel cells.

An outline configuration of the multistage fuel cell system 10B is the same as the outline configuration of the multistage fuel cell system 10 illustrated in FIG. 1. A control system of the multistage fuel cell system 10B is the same as the control system of the multistage fuel cell system 10 illustrated in FIG. 2.

Figure 9:
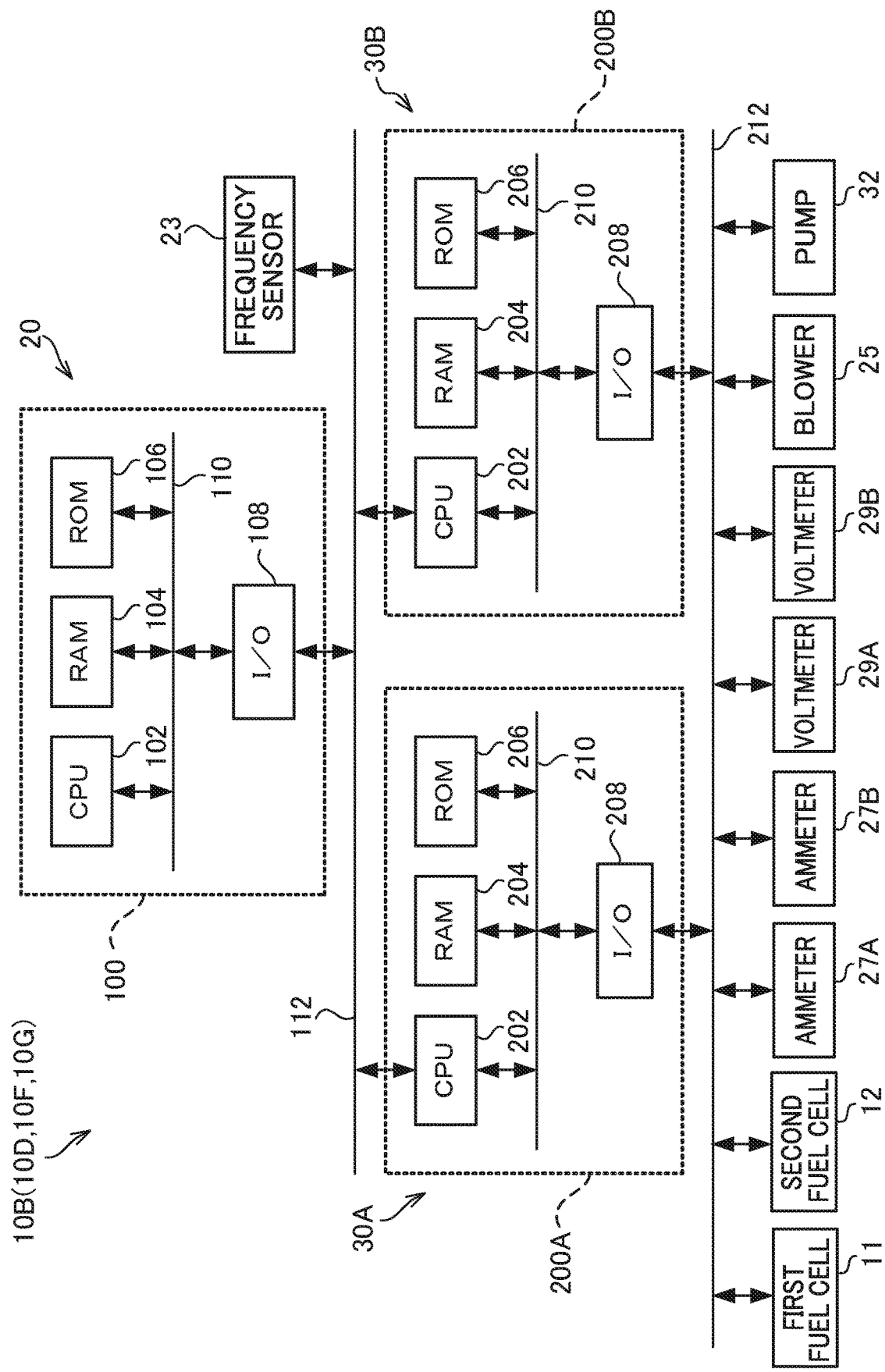
FIG. 9 is a diagram illustrating an example of configuration of a multistage fuel cell system according to a third exemplary embodiment, a fifth exemplary embodiment, a seventh exemplary embodiment, and an eighth exemplary embodiment in a case in which control is performed using a computer.

Output control of the fuel cells by the PCS 20 and the current control units 30A, 30B of the multistage fuel cell system 10B may be implemented employing a computer configuration such as that illustrated in FIG. 9. The configuration illustrated in FIG. 9 differs from the configuration illustrated in FIG. 3 in the point that ammeters 27A, 27B and voltmeters 29A and 29B are connected to the second external bus 212. Other configurations are the same to those illustrated in FIG. 3.

The ammeter 27A measures the magnitude of the current being output from the first fuel cell 11. The ammeter 27B measures the magnitude of the current being output from the second fuel cell 12. The voltmeter 29A measures the magnitude of the voltage being output from the first fuel cell 11. The voltmeter 29B measures the magnitude of the voltage being output from the second fuel cell 12.

Explanation follows regarding output control of the fuel cells in the multistage fuel cell system 10B.

Figure 10:
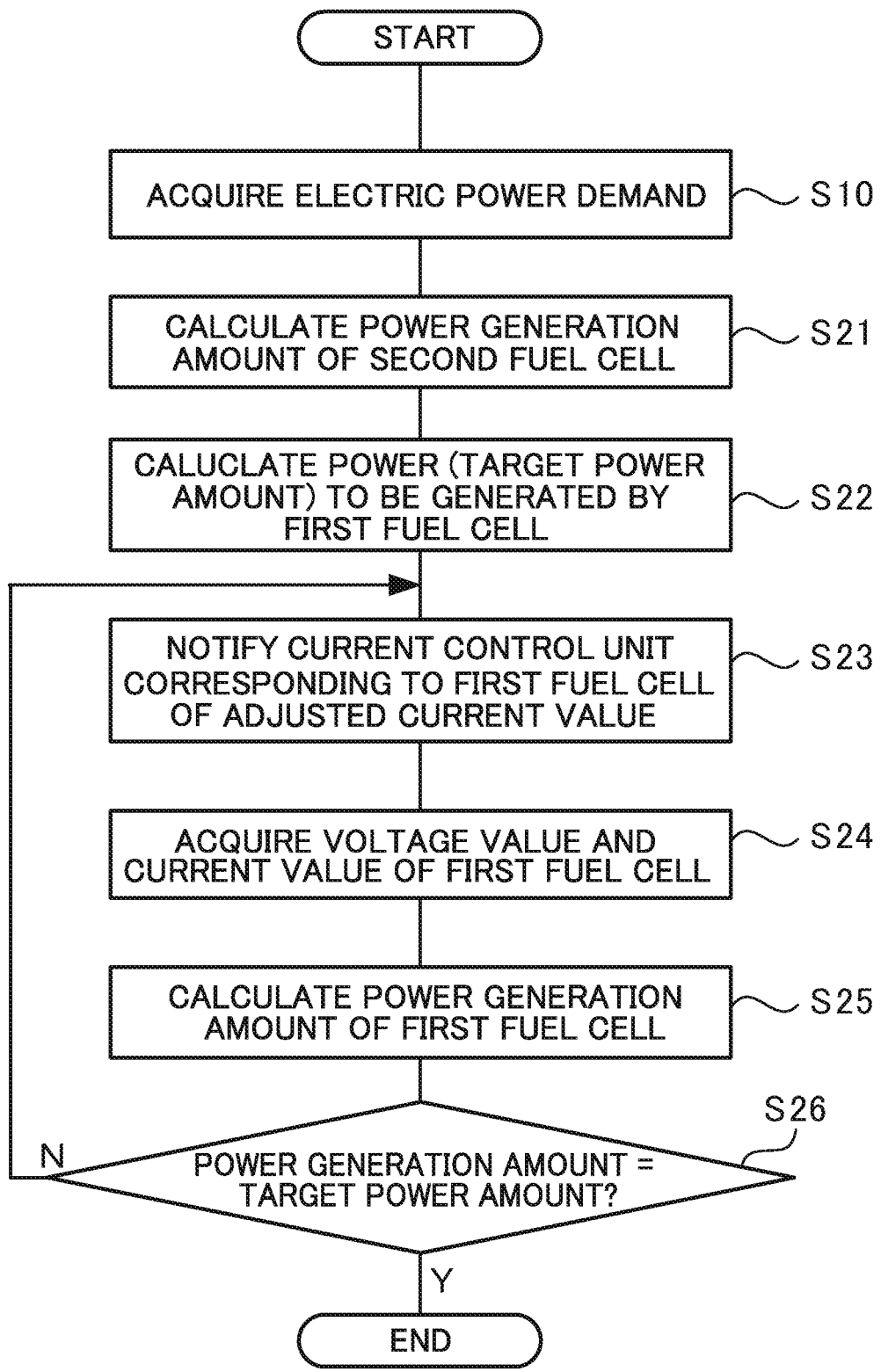
FIG. 10 is a flowchart illustrating an example of a flow of multistage fuel cell control processing according to the third exemplary embodiment.

FIG. 10 is a flowchart illustrating an example of a flow of multistage fuel cell control processing based on a multistage fuel cell control program executed by the CPU 102 included in the PCS 20 of the multistage fuel cell system 10B. The multistage fuel cell control program is stored in advance in the ROM 106, and the CPU 102 reads the multistage fuel cell control program from the ROM 106 and executes the multistage fuel cell control program. Here, the PCS 20 is understood to be in a state already supplying electric power generated by the fuel cells to the load 40. Specifically, the power generation amount of the second fuel cell 12 is set to a predetermined value. Note that the value of the predetermined power generation amount may be varied according to the magnitude of the load 40.

First, at step S10, the PCS 20 executes the processing explained with regard to step S10 in FIG. 4 to acquire the electric power demand of the load 40.

At step S21, the PCS 20 controls the current control unit 30B to measure the voltage value and the current value being output from the second fuel cell 12, and notify the PCS 20 of the measurement results thereof. The current control unit 30B controlled in this manner measures the current value being output from the second fuel cell 12 using the ammeter 27B, and measures the voltage value being output from the second fuel cell 12 using the voltmeter 29B, and notifies the PCS 20 of the measured voltage value and current value.

The PCS 20 employs the voltage value and current value notified from the current control unit 30B to calculate the power generation amount of the second fuel cell 12.

At step S22, the PCS 20 calculates a power deficit amount with respect to the electric power demand of the load 40 by subtracting the power generation amount of the second fuel cell 12 calculated at step S21 from the electric power demand of the load 40 acquired at step S10. Namely, the PCS 20 calculates a target power amount to be generated by the first fuel cell 11. Note that since the power generation amount of the second fuel cell 12 is preset so as to be less than the envisaged electric power demand of the load 40, the target power amount is a positive value.

At step S23, for example, the PCS 20 notifies the current control unit 30A of a predetermined current value, configuring an initial value, as the first current value when step S23 is being performed for the first time. From the second time step S23 is performed onward, the PCS 20 notifies the current control unit 30A of a new first current value, this being a current value that has been varied from the first current value of which the current control unit 30A was notified on the preceding occasion. Note that the method for varying the first current value will be described later.

At step S24, the PCS 20 controls the current control unit 30A to measure the voltage value and the current value being output from the first fuel cell 11, and notify the PCS 20 of the measurement results thereof. The current control unit 30A controlled in this manner measures the current value being output from the first fuel cell 11 using the ammeter 27A, and measures the voltage value being output from the first fuel cell 11 using the voltmeter 29A, and notifies the PCS 20 of the measured voltage value and current value. The PCS 20 is thus able to acquire the voltage value and the current value of the first fuel cell 11.

At step S25, the PCS 20 employs the voltage value and the current value acquired at step S24 to calculate the power generation amount of the first fuel cell 11.

At step S26, the PCS 20 determines whether or not the power generation amount of the first fuel cell 11 calculated at step S25 matches the target power amount calculated at step S22. Here, a "match" between the power generation amount of the first fuel cell 11 and the target power amount includes not only cases in which the power generation amount of the first fuel cell 11 and the target power amount are the same value, but also cases in which an absolute value of the difference between the power generation amount of the first fuel cell 11 and the target power amount falls within a predetermined range in which the power generation amount of the first fuel cell 11 and the target power amount may be considered to be the same value as each other.

When the determination processing of step S26 yields negative determination, this indicates a state in which the total power generation amount of the first fuel cell 11 and the power generation amount of the second fuel cell 12 does not match the electric power demand of the load 40. Processing therefore transitions to step S23, and the current control unit 30A is notified of a new first current value adjusted to make the total power generation amount of the first fuel cell 11 and the power generation amount of the second fuel cell 12 match the electric power demand of the load 40.

More specifically, in cases in which the power generation amount of the first fuel cell 11 is larger than the target power amount, a current value adjusted in order to lower the power generation amount of the first fuel cell 11 should be set as the new first current value. In cases in which the power generation amount of the first fuel cell 11 is smaller than the target power amount, a current value adjusted in order to raise the power generation amount of the first fuel cell 11 should be set as the new first current value.

The processing of steps S23 to S26 is repeated. When the power generation amount of the first fuel cell 11 matches the target power amount, the determination processing of step S26 yields affirmative determination and the multistage fuel cell control processing illustrated in FIG. 10 is ended.

Namely, by ending the multistage fuel cell control processing illustrated in FIG. 10, the total power generation amount of the first fuel cell 11 and the second fuel cell 12 is controlled so as to approach the electric power demand of the load 40.

Note that in the multistage fuel cell control processing illustrated in FIG. 10, the power generation amount of the first fuel cell 11 corresponding to an earlier stage fuel cell is controlled while the power generation amount of the second fuel cell 12 remains set at a predetermined value, similarly to in the multistage fuel cell control processing according to the second exemplary embodiment, and is therefore an example of "earlier stage adjustment".

At step S21 of the multistage fuel cell control processing illustrated in FIG. 10, the voltage value and current value of the second fuel cell 12 are measured to calculate the power generation amount of the second fuel cell 12. However, the PCS 20 may, for example, refer to the current-voltage characteristics 60 corresponding to the second fuel cell 12 stored in the ROM 106, and calculate the power generation amount of the second fuel cell 12 from a set second current value. In such cases, the voltmeter 29B and the ammeter 27B that respectively measure the voltage value and the current value of the second fuel cell 12 are not required. This also enables a reduction in the time required to perform the multistage fuel cell control processing in comparison to cases in which the voltage value and the current value of the second fuel cell 12 are measured in order to calculate the power generation amount of the second fuel cell 12.

In this manner, the multistage fuel cell system 10B according to the third exemplary embodiment varies the first current value while measuring the power generation amount of the first fuel cell 11, while the power generation amount of the second fuel cell 12 remains fixed, in order to control such that the total power generation amount of the first fuel cell 11 and the second fuel cell 12 approaches the electric power demand of the load 40.

In the multistage fuel cell system 10B, the first current value is controlled based on the actual power generation amount of the first fuel cell 11, enabling electric power supply to be more precisely controlled in response to the electric power demand of the load 40 than in cases in which the first current value is controlled based on the pre-defined current-voltage characteristics 60. Namely, the multistage fuel cell system 10B is capable of supplying electric power to match the electric power demand of the load 40 irrespective of degradation of the fuel cells, while also suppressing degradation of the second fuel cell 12.

Fourth Exemplary Embodiment

In the second exemplary embodiment, explanation has been given regarding the multistage fuel cell system 10A in which the power generation amount of the first fuel cell 11 is controlled while the power generation amount of the second fuel cell 12 remains set to a predetermined value in order to supply electric power in response to the electric power demand of the load 40. However, in a fourth exemplary embodiment, explanation is given regarding a multistage fuel cell system 10C in which the power generation amount of the second fuel cell 12, serving as an example of a later stage fuel cell, is controlled while the power generation amount of the first fuel cell 11, serving as an example of an earlier stage fuel cell, remains set at a predetermined value in order to supply electric power in response to the electric power demand of the load 40.

To say that the power generation amount of the first fuel cell 12 is set to a predetermined value encompasses not only a situation in which the power generation amount of the first fuel cell 12 is fixed to a single power generation amount, but also situations in which some form of power generation amount has been set, for example a power generation amount that varies in response to the electric power demand of the load 40.

An outline configuration of the multistage fuel cell system 10C is the same as the outline configuration of the multistage fuel cell system 10 illustrated in FIG. 1. A control system of the multistage fuel cell system 10C is the same as the control system of the multistage fuel cell system 10 illustrated in FIG. 2. The multistage fuel cell system 10C loads and executes a program from memory into a processor, thereby enabling the computers 100, 200A, and 200B illustrated in FIG. 3 to be employed to implement functional sections relating to control of the PCS 20 and current control units 30A, 30B of the multistage fuel cell system 10C.

Explanation follows regarding output control of the fuel cells of the multistage fuel cell system 10C.

Figure 11:
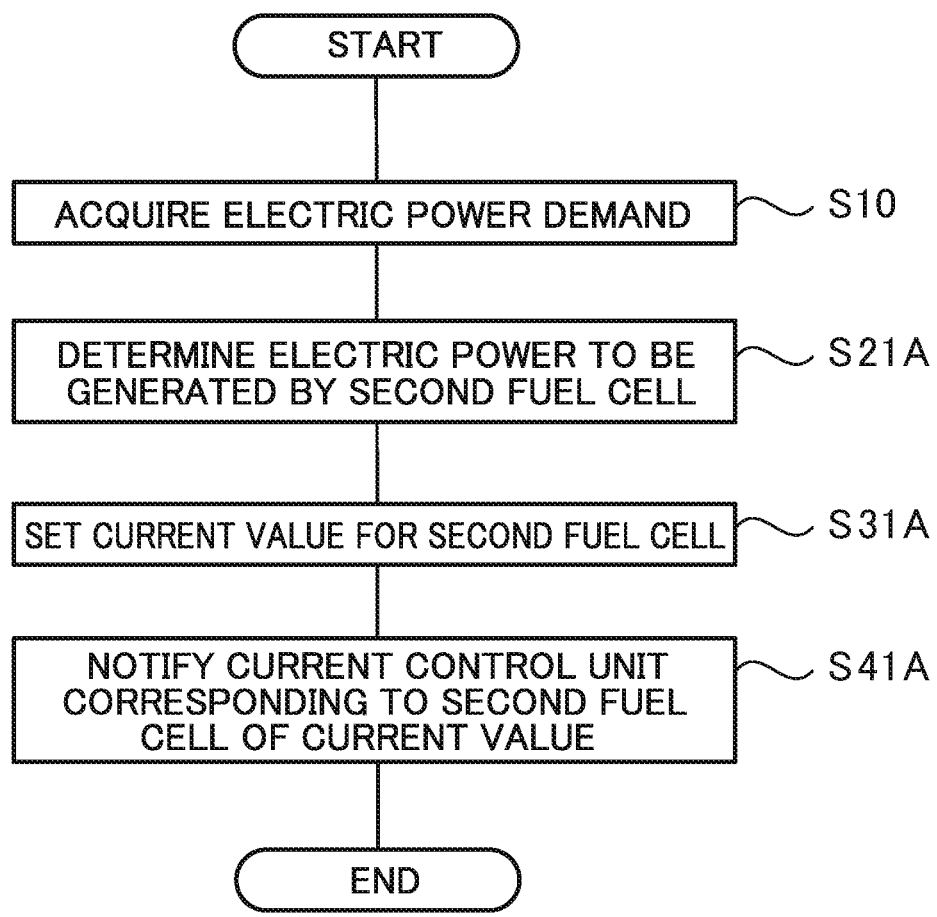
FIG. 11 is a flowchart illustrating an example of a flow of multistage fuel cell control processing according to a fourth exemplary embodiment.

FIG. 11 is a flowchart illustrating an example of a flow of multistage fuel cell control processing based on a multistage fuel cell control program executed by the CPU 102 included in the PCS 20 of the multistage fuel cell system 10C. The multistage fuel cell control program is stored in advance in the ROM 106, and the CPU 102 reads the multistage fuel cell control program from the ROM 106 and executes the multistage fuel cell control program. Here, the PCS 20 is understood to be in a state already supplying electric power generated by the fuel cells to the load 40. Specifically, the power generation amount of the first fuel cell 11 is set to a predetermined value. Note that the value of the predetermined power generation amount may be varied according to the magnitude of the load 40.

First, at step S10, the PCS 20 executes the processing explained with regard to step S10 in FIG. 4 to acquire the electric power demand of the load 40.

At step S21A, the PCS 20 determines the electric power to be generated by the second fuel cell 12 from the electric power demand of the load 40 as acquired at step S10 and the power generation amount of the first fuel cell 11. The power generation amount of the first fuel cell 11 is set in advance in the multistage fuel cell system 10C, and is controlled such that the power generation amount of the first fuel cell 11 does not fluctuate. Accordingly, if the PCS 20 controls such that the second fuel cell 12 generates electric power matching the electric power demand of the load 40 as acquired at step S10 minus the predetermined power generation amount of the first fuel cell 11, the total power generation amount of the first fuel cell 11 and the second fuel cell 12 will match the electric power demand of the load 40.

At step S31A, the PCS 20 refers to the pre-defined current-voltage characteristics 60 for the second fuel cell 12, and sets a current at which the product of the voltage and the current becomes the electric power generated by the second fuel cell 12 as determined at step S21 as the second current value.

At step S41A, the PCS 20 notifies the current control unit 30B through the I/O 108 of the second current value set at step S31A.

Subsequently, the current control unit 30B executes the fuel cell control processing illustrated in FIG. 6 to perform control such that the magnitude of the current being output from the second fuel cell 12 approaches the second current value. Accordingly, electric power is supplied from the multistage fuel cell system 10C in response to the electric power demand of the load 40.

Note that a control method such as that described in the fourth exemplary embodiment, in which the power generation amount of the second fuel cell 12 corresponding to a later stage fuel cell is controlled while the power generation amount of the first fuel cell 11 remains set at a predetermined value, is sometimes referred to as "later stage adjustment".

As already described above, in the multistage fuel cell system 10C the power generation amount of the first fuel cell 11 is controlled so as to become a predetermined value, for example the rated output of the first fuel cell 11. More specifically, the PCS 20 notifies the current control unit 30A of a first current value set with reference to the current-voltage characteristics 60 corresponding to the first fuel cell 11 such that the power generation amount of the first fuel cell 11 becomes a predetermined value. Note that since the first current value does not vary in the multistage fuel cell system 10C, it is sufficient for the current control unit 30A to be notified of the first current value a single time at the start of power generation.

In the multistage fuel cell system 10C according to the fourth exemplary embodiment, since the power generation amount of the second fuel cell 12 is controlled while the power generation amount of the first fuel cell 11 remains set at a predetermined value, the fluctuation amount of the current being output from the first fuel cell 11 is smaller than the fluctuation amount of the current being output from the second fuel cell 12. This enables degradation of the first fuel cell 11 to be suppressed in comparison to cases in which control is performed to vary the power generation amount of the first fuel cell 11.

Moreover, in the multistage fuel cell system 10C, since the power generation amount of the first fuel cell 11 is set to a predetermined value, variation in the flow rate of off-gas exhausted from the first fuel cell 11, and variation in the composition of the off-gas are reduced in comparison to cases in which the power generation amount of the first fuel cell 11 is varied. Accordingly, degradation of components involved in the generation of regenerated fuel gas, for example the water vapor separation film 16, the first heat exchanger 21, the off-gas path 52, and the regenerated fuel gas path 54, is suppressed in comparison to cases in which the power generation amount of the first fuel cell 11 is varied.

Moreover, supposing the rated output of the second fuel cell 12 were greater than the rated output of the first fuel cell 11 when the rated output of the first fuel cell 11 and the rated output of the second fuel cell 12 are compared, it may be assumed that the second fuel cell 12 includes more power generating cells than the first fuel cell 11. Namely, the second fuel cell 12 enables the amount of electric power to be varied by changing the current by a smaller amount than would be required for the first fuel cell 11 to vary the amount of electric power by an equivalent amount.

Accordingly, in cases in which the rated output of the second fuel cell 12 is larger than the rated output of the first fuel cell 11, executing the multistage fuel cell control processing according to the fourth exemplary embodiment illustrated in FIG. 11 enables degradation of the first fuel cell 11 and the second fuel cell 12 to be suppressed compared to cases in which both the currents output from both the first fuel cell 11 and the second fuel cell 12 are varied.

Fifth Exemplary Embodiment

In the fourth exemplary embodiment, the second current value is set in response to the electric power demand of the load 40 with reference to the current-voltage characteristics 60 corresponding to the second fuel cell 12.

However, as already explained in the third exemplary embodiment, as fuel cell degradation progresses, the current-voltage characteristics 60 change.

Accordingly, in a fifth exemplary embodiment, explanation is given regarding a multistage fuel cell system 10D in which electric power is supplied in response to the electric power demand of the load 40 by controlling the power generation amount of the second fuel cell 12 while the power generation amount of the first fuel cell 11 remains set at a predetermined value, without employing the pre-defined current-voltage characteristics 60 of the fuel cells.

An outline configuration of the multistage fuel cell system 10D is the same as the outline configuration of the multistage fuel cell system 10 illustrated in FIG. 1. A control system of the multistage fuel cell system 10D is the same as the control system of the multistage fuel cell system 10 illustrated in FIG. 2.

The computers 100, 200A, and 200B illustrated in FIG. 9 can be employed to implement functional sections relating to control of the PCS 20 and current control units 30A, 30B of the multistage fuel cell system 10D by the multistage fuel cell system 10D loading and executing a program from memory into a processor.

Explanation follows regarding output control of the fuel cells of the multistage fuel cell system 10D.

Figure 12:
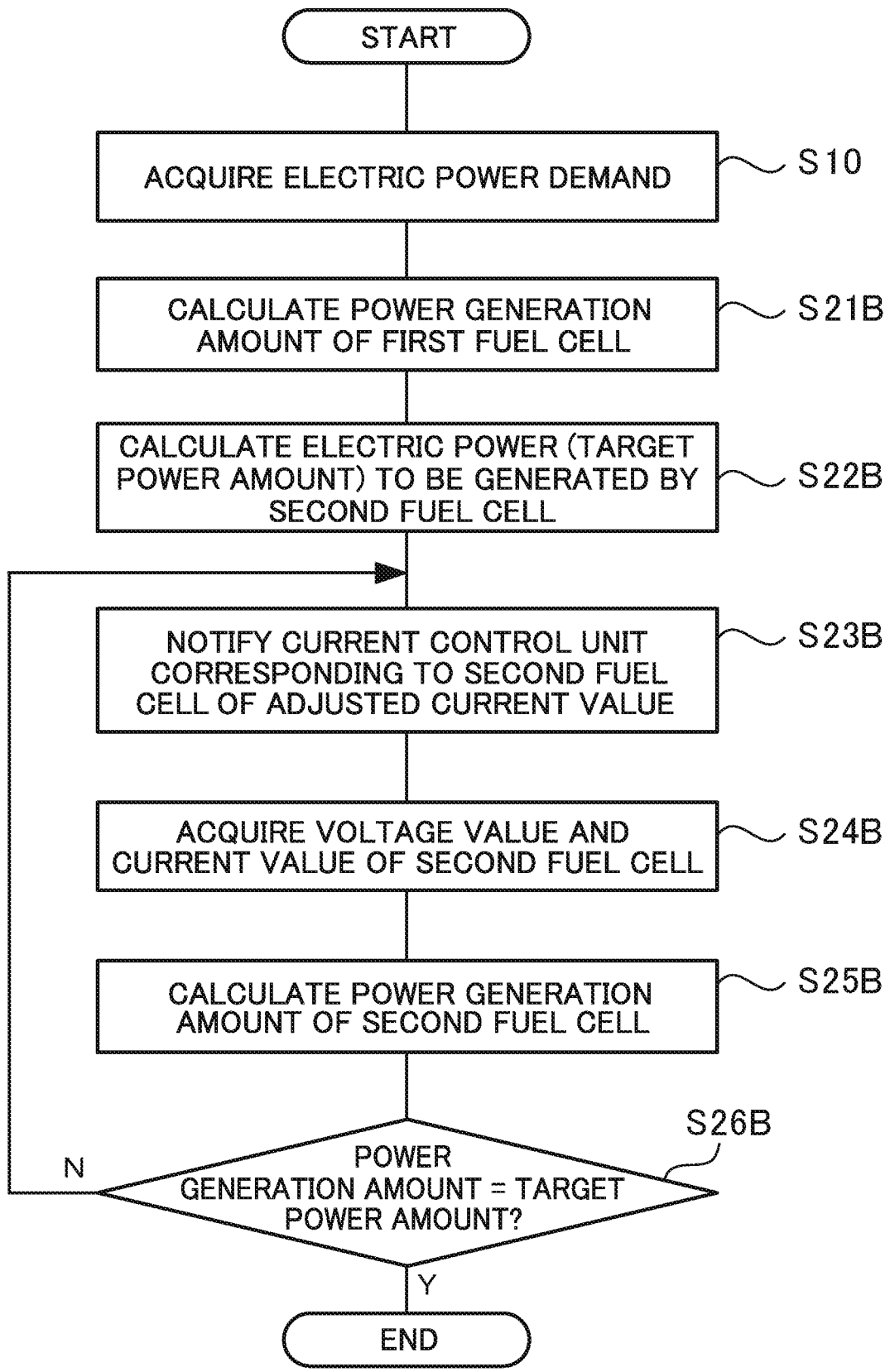
FIG. 12 is a flowchart illustrating an example of a flow of multistage fuel cell control processing according to the fifth exemplary embodiment.

FIG. 12 is a flowchart illustrating an example of a flow of multistage fuel cell control processing based on a multistage fuel cell control program executed by the CPU 102 included in the PCS 20 of the multistage fuel cell system 10D. The multistage fuel cell control program is stored in advance in the ROM 106, and the CPU 102 reads the multistage fuel cell control program from the ROM 106 and executes the multistage fuel cell control program. Here, the PCS 20 is understood to be in a state already supplying electric power generated by the fuel cells to the load 40. Specifically, the power generation amount of the first fuel cell 11 is set to a predetermined value. Note that the value of the predetermined power generation amount may be varied according to the magnitude of the load 40.

First, at step S10, the PCS 20 executes the processing explained with regard to step S10 in FIG. 4 to acquire the electric power demand of the load 40.

At step S21B, the PCS 20 controls the current control unit 30A to measure the voltage value and the current value being output from the first fuel cell 11, and notify the PCS 20 of the measurement results thereof. The current control unit 30A controlled in this manner measures the current value being output from the first fuel cell 11 using the ammeter 27A, and measures the voltage value being output from the first fuel cell 11 using the voltmeter 29A, and notifies the PCS 20 of the measured voltage value and current value.

The PCS 20 employs the voltage value and the current value notified by the current control unit 30A to calculate the power generation amount of the first fuel cell 11.

At step S22B, the PCS 20 calculates a power deficit amount with respect to the electric power demand of the load 40 by subtracting the power generation amount of the first fuel cell 11 calculated at step S21B from the electric power demand of the load 40 acquired at step S10. Namely, the PCS 20 calculates a target power amount to be generated by the second fuel cell 12. Note that since the power generation amount of the first fuel cell 11 is preset so as to be less than the envisaged electric power demand of the load 40, the target power amount is a positive value.

At step S23B, for example, the PCS 20 notifies the current control unit 30B of a predetermined current value, configuring an initial value, as the second current value when step S23B is being performed for the first time. From the second time step S23B is performed onward, the PCS 20 notifies the current control unit 30B of a new second current value, this being a current value that has been varied from the second current value with which the current control unit 30B was notified on the preceding occasion. Note that the method for varying the second current value will be described later.

At step S24B, the PCS 20 controls the current control unit 30B to measure the voltage value and the current value being output from the second fuel cell 12, and notify the PCS 20 of the measurement results thereof. The current control unit 30B controlled in this manner measures the current value being output from the second fuel cell 12 using the ammeter 27B, and measures the voltage value being output from the second fuel cell 12 using the voltmeter 29B, and notifies the PCS 20 of the measured voltage value and current value. The PCS 20 is thus able to acquire the voltage value and the current value of the second fuel cell 12.

At step S25B, the PCS 20 employs the voltage value and the current value acquired at step S24B to calculate the power generation amount of the second fuel cell 12.

At step S26B, the PCS 20 determines whether or not the power generation amount of the second fuel cell 12 calculated at step S25B matches the target power amount calculated at step S22B.

When the determination processing of step S26B yields negative determination, this indicates a state in which the total of the power generation amount of the first fuel cell 11 and the power generation amount of the second fuel cell 12 does not match the electric power demand of the load 40. Processing therefore transitions to step S23B, and the current control unit 30B is notified of a new second current value adjusted to make the total of the power generation amount of the first fuel cell 11 and the power generation amount of the second fuel cell 12 match the electric power demand of the load 40. The method used to adjust the second current value at step S23B may be the same method as the method used to adjust the first current value at step S23 in FIG. 10.

The processing of steps S23B to S26B is repeated. When the power generation amount of the second fuel cell 12 matches the target power amount, the determination processing of step S26B yields affirmative determination and the multistage fuel cell control processing illustrated in FIG. 12 is ended.

Namely, by ending the multistage fuel cell control processing illustrated in FIG. 12, the total power generation amount of the first fuel cell 11 and the second fuel cell 12 is controlled so as to approach the electric power demand of the load 40.

Note that in the multistage fuel cell control processing illustrated in FIG. 12, the power generation amount of the second fuel cell 12 corresponding to a later stage fuel cell is controlled while the power generation amount of the first fuel cell 11 remains set at a predetermined value, similarly to in the multistage fuel cell control processing according to the fourth exemplary embodiment, and is therefore an example of "later stage adjustment".

At step S21B of the multistage fuel cell control processing illustrated in FIG. 12, the voltage value and current value of the first fuel cell 11 are measured to calculate the power generation amount of the first fuel cell 11. However, the PCS 20 may, for example, refer to the current-voltage characteristics 60 corresponding to the first fuel cell 11 stored in the ROM 106, and calculate the power generation amount of the first fuel cell 11 from a set first current value. In such cases, the voltmeter 29A and the ammeter 27A that respectively measure the voltage value and the current value of the first fuel cell 11 are not required. This also enables a reduction in the time required to perform the multistage fuel cell control processing in comparison to cases in which the voltage value and the current value of the first fuel cell 11 are measured in order to calculate the power generation amount of the first fuel cell 11.

In this manner, the multistage fuel cell system 10D according to the fifth exemplary embodiment varies the second current value while measuring the power generation amount of the second fuel cell 12, while the power generation amount of the first fuel cell 11 remains fixed, in order to control such that the total power generation amount of the first fuel cell 11 and the second fuel cell 12 approaches the electric power demand of the load 40.

Since the second current value is controlled based on the actual power generation amount of the second fuel cell 12, power supply can be more precisely controlled in response to the electric power demand of the load 40 than in cases in which the second current value is controlled based on the pre-defined current-voltage characteristics 60. Namely, the multistage fuel cell system 10D is capable of supplying power to match the electric power demand of the load 40 irrespective of degradation of the fuel cells, while also suppressing degradation of the first fuel cell 11.

Sixth Exemplary Embodiment

As illustrated in FIG. 2, the control systems of the multistage fuel cell systems 10A, 10B, 10C, and 10D according to the first to fifth exemplary embodiments include the current control unit 30A and the current control unit 30B that respectively control the power generation amounts of the first fuel cell 11 and the second fuel cell 12 with individual control.

Figure 13:
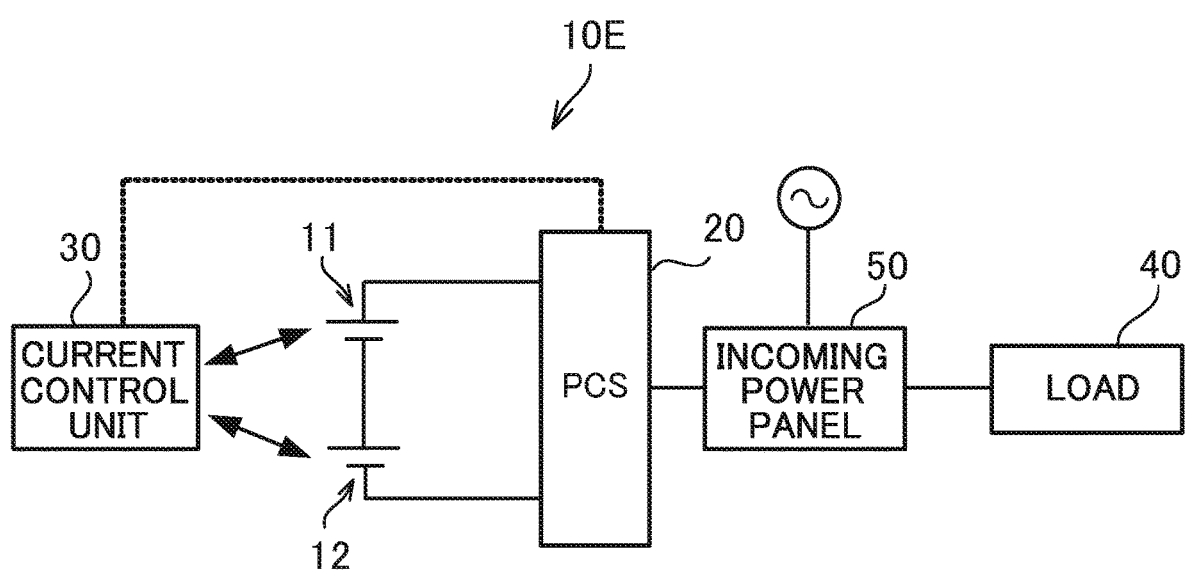
FIG. 13 is a schematic configuration diagram illustrating a control system of a multistage fuel cell system according to a sixth exemplary embodiment.

However, in the control system of a multistage fuel cell system 10E according to a sixth exemplary embodiment, the first fuel cell 11 and the second fuel cell 12 are connected in series as illustrated in FIG. 13, and respective output terminals of the first fuel cell 11 and the second fuel cell 12 that are connected in series are connected to the PCS 20. The current control unit 30A and the current control unit 30B that controlled the first fuel cell 11 and the second fuel cell 12 individually have been consolidated into a single current control unit 30. The single current control unit 30 controls the power generation amounts of both the first fuel cell 11 and the second fuel cell 12.

Figure 14:
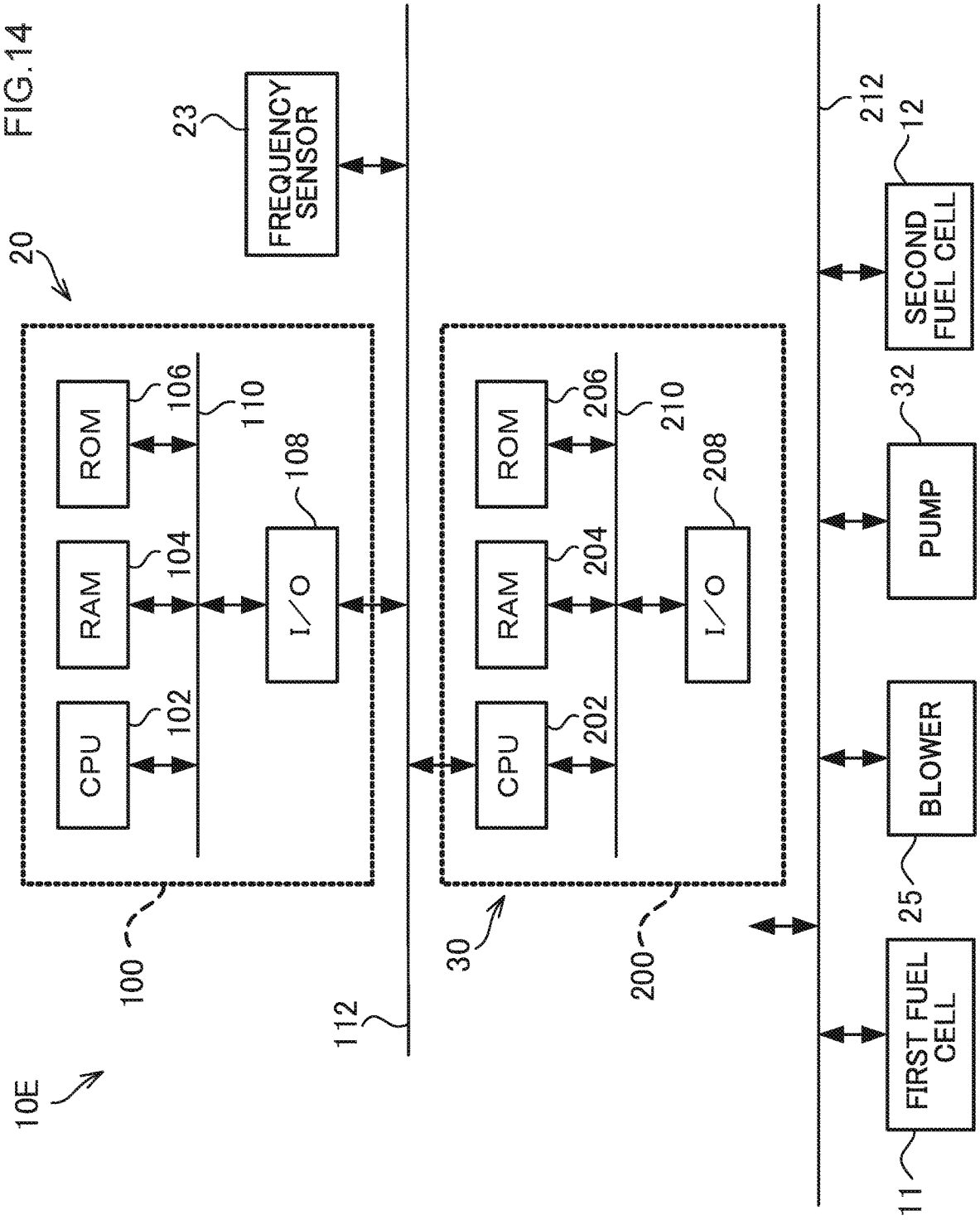
FIG. 14 is a diagram illustrating an example of configuration of a multistage fuel cell system according to the sixth exemplary embodiment in a case in which control is performed using a computer.

FIG. 14 illustrates an example of configuration in a case in which the multistage fuel cell system 10E is configured by a computer.

The computer 200A and the computer 200B configuring the multistage fuel cell system 10 according to the first exemplary embodiment illustrated in FIG. 3 have been consolidated into a single computer 200.

Figure 15:
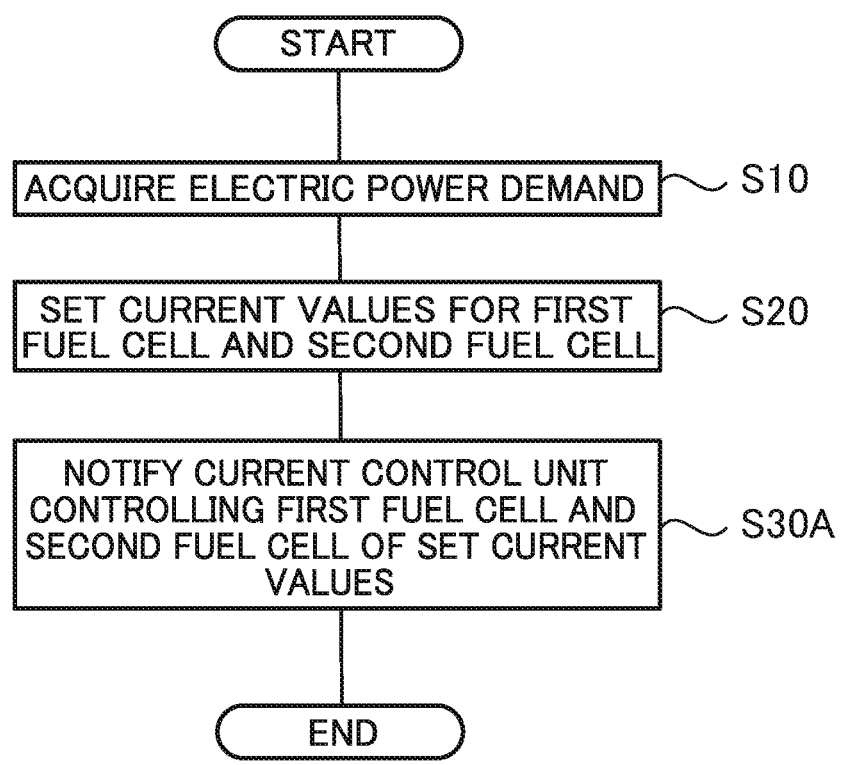
FIG. 15 is a flowchart illustrating an example of a flow of multistage fuel cell control processing according to the sixth exemplary embodiment.

FIG. 15 is a flowchart illustrating an example of a flow of multistage fuel cell control processing based on a multistage fuel cell control program executed by the CPU 102 included in the PCS 20 of the multistage fuel cell system 10E. The CPU 102 reads the multistage fuel cell control program from the ROM 106 and executes the multistage fuel cell control program.

First, at step S10, the PCS 20 executes similar processing to that of step S10 in FIG. 4 to acquire the electric power demand of the load 40.

At step S20, the PCS 20 refers to the current-voltage characteristics 60 to determine the current values of the first fuel cell 11 and the second fuel cell 12 such that the total power generation amount of the first fuel cell 11 and the second fuel cell 12 approaches the electric power demand of the load 40 acquired at step S10.

At step S30A, the PCS 20 notifies the current control unit 30 through the I/O 108 of the current values set at step S20.

When the current control unit 30 receives the current values from the PCS 20, the currents being output from the first fuel cell 11 and the second fuel cell 12 are controlled such that the magnitudes of the currents being output from the first fuel cell 11 and the second fuel cell 12 approach the received current values.

Although an example has been given in which the current values of the first fuel cell 11 and the second fuel cell 12 are controlled, configuration may be made in which the voltage values of the first fuel cell 11 and the second fuel cell 12 are determined at step S20 in FIG. 4 so as to approach the electric power demand, and the voltage values of the first fuel cell 11 and the second fuel cell 12 are controlled so as to approach the determined voltage values.

Moreover, the multistage fuel cell system 10E may measure the actual current values and voltage values of the first fuel cell 11 and the second fuel cell 12 and calculate the power generation amounts of the first fuel cell 11 and the second fuel cell 12 without referencing the current-voltage characteristics 60 at step S20. The output of at least one out of the first fuel cell 11 or the second fuel cell 12 may then be controlled such that the total calculated power generation amount approaches the electric power load.

In this manner, the multistage fuel cell system 10E according to the sixth exemplary embodiment controls the power generation amounts of the first fuel cell 11 and the second fuel cell connected in series using the single current control unit 30.

In cases in which there is little fluctuation in the electric power demand, it is simpler to perform control by connecting the first fuel cell 11 and the second fuel cell in series and using the single current control unit 30 to control the power generation amounts of the first fuel cell 11 and the second fuel cell than it is to control the power generation amounts of the first fuel cell 11 and the second fuel cell individually by providing plural current control units. Moreover, since there is no need to provide plural current control units, the costs of the multistage fuel cell system 10E can also be reduced.

Seventh Exemplary Embodiment

In the first to the sixth exemplary embodiments, explanation has been given regarding the multistage fuel cell systems 10, 10A to 10D in which the power generation amounts of the fuel cells are controlled using a single control method out of uniform adjustment, earlier stage adjustment, or later stage adjustment. However, in a seventh exemplary embodiment, explanation is given regarding a multistage fuel cell system 10F that controls the power generation amounts of the fuel cells using a combination of uniform adjustment, earlier stage adjustment, and later stage adjustment.

An outline configuration of the multistage fuel cell system 10F is the same as the outline configuration of the multistage fuel cell system 10 illustrated in FIG. 1. A control system of the multistage fuel cell system 10F is the same as the control system of the multistage fuel cell system 10 illustrated in FIG. 2.

The multistage fuel cell system 10F loads and executes a program from memory into a processor, thereby enabling the computers 100, 200A, and 200B illustrated in FIG. 9 to be employed to implement functional sections relating to control of the PCS 20 and current control units 30A, 30B of the multistage fuel cell system 10F.

The following explanation assumes that the rated output of the first fuel cell 11 is greater than the rated output of the second fuel cell 12.

Explanation follows regarding output control of the fuel cells of the multistage fuel cell system 10F.

Figure 16:
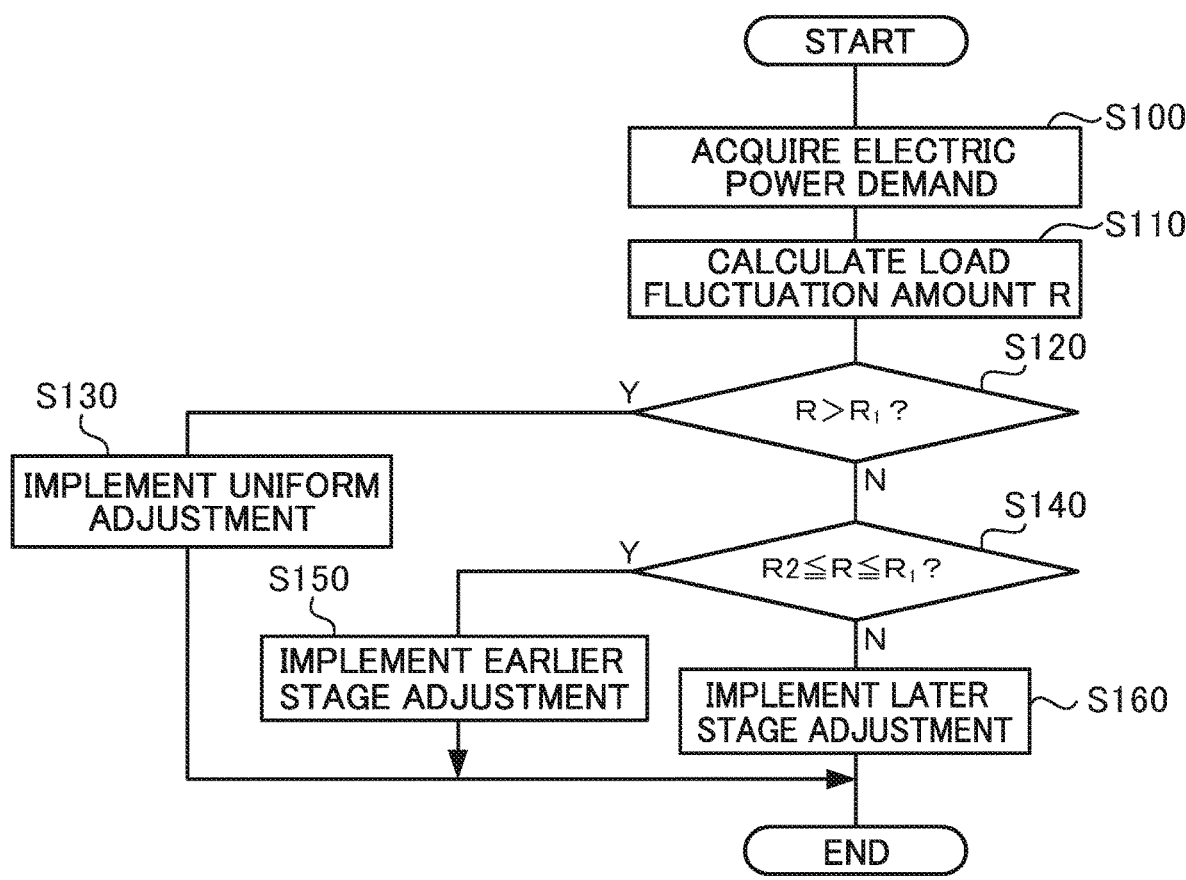
FIG. 16 is a flowchart illustrating an example of a flow of multistage fuel cell control processing according to the seventh exemplary embodiment.

FIG. 16 is a flowchart illustrating an example of a flow of multistage fuel cell control processing based on a multistage fuel cell control program executed by the CPU 102 included in the PCS 20 of the multistage fuel cell system 10F. The multistage fuel cell control program is stored in advance in the ROM 106, and the CPU 102 reads the multistage fuel cell control program from the ROM 106 and executes the multistage fuel cell control program. Here, the PCS 20 is understood to be in a state already supplying electric power generated by the fuel cells to the load 40.

First, at step S100, the PCS 20 executes similar processing to that of step S10 in FIG. 4 to acquire the electric power demand of the load 40. Whenever this is performed, the PCS 20 stores the acquired electric power demand of the load 40 in the RAM 104 in chronological order.

At step S110, the PCS 20 acquires the two most recently acquired electric power demands of the load 40 from the RAM 104, and calculates an absolute value ratio of the difference between the electric power demands of the load 40 acquired at step S100, namely calculates a load fluctuation ratio R.

At step S120, the PCS 20 compares a threshold value $R_1$, which the load fluctuation ratio R may be considered to be relatively larger than in cases in which the load fluctuation ratio R exceeds this value, against the load fluctuation ratio R calculated at step S110, and determines whether or not the load fluctuation ratio R is greater than the threshold value $R_1$. Note that the threshold value $R_1$ may, for example, be derived in advance by testing using the actual multistage fuel cell system 10F, or by computer simulations based on the design specifications of the multistage fuel cell system 10F, and stored in a predetermined region of the ROM 106.

In cases in which the determination processing of step S120 yields affirmative determination, if attempting to align the electric power supplied from the multistage fuel cell system 10F to the electric power demand of the load 40 by earlier stage adjustment or later stage adjustment, the change amount in the current being output from the first fuel cell 11 or the second fuel cell 12 must be larger than in cases in which the power generation amounts of the fuel cells are controlled by uniform adjustment. Namely, the time required to make the electric power supplied from the multistage fuel cell system 10F match the electric power demand of the load 40 is longer than in the case of uniform adjustment, resulting in poorer load tracking response performance.

Accordingly, in cases in which the determination processing of step S120 yields affirmative determination, processing transitions to step S130. At step S130, the PCS 20 executes the multistage fuel cell control processing according to the first exemplary embodiment illustrated in FIG. 4, namely uniform adjustment. This concludes the multistage fuel cell control processing illustrated in FIG. 16.

In cases in which the determination processing of step S120 yields negative determination, processing transitions to step S140.

At step S140, the PCS 20 compares the threshold value $R_1$ and a threshold value $R_2$, which the load fluctuation ratio R may be considered to be relatively smaller than in cases in which the load fluctuation ratio R is below this value, against the load fluctuation ratio R calculated at step S110, and determines whether or not the load fluctuation ratio R is the threshold value $R_2$ or greater and the threshold value $R_1$ or lower, namely whether or not the load fluctuation ratio R is at a moderate level.

In cases in which the determination processing of step S140 yields affirmative determination, since the rated output of the first fuel cell 11 is larger than the rated output of the second fuel cell 12, for the same fluctuation in the power generation amount, a smaller change amount to the current will suffice if the current of the first fuel cell 11 is adjusted to control the power generation amount than if the current of the second fuel cell 12 were adjusted to control the power generation amount. Namely, in cases in which the load fluctuation ratio R is at a moderate level, the degree of degradation to the first fuel cell 11 when performing earlier stage adjustment is suppressed in comparison to the degree of degradation to the second fuel cell 12 when performing later stage adjustment. Accordingly, the degree of degradation to the fuel cells is suppressed when the overall multistage fuel cell system 10F is considered.

Accordingly, in cases in which the determination processing of step S140 yields affirmative determination, processing transitions to step S150. At step S150, the PCS 20 executes earlier stage adjustment as exemplified by the multistage fuel cell control processing according to the second exemplary embodiment illustrated in FIG. 7 or the multistage fuel cell control processing according to the third exemplary embodiment illustrated in FIG. 10. This concludes the multistage fuel cell control processing illustrated in FIG. 16.

In cases in which the determination processing of step S140 yields negative determination, processing transitions to step S160.

In such cases, since the load fluctuation ratio R is relatively small, the degree of degradation to the second fuel cell 12 will be smaller than in cases in which the load fluctuation ratio R is the threshold value $R_2$ or greater, even when later stage adjustment is performed. Accordingly, at step S160, the PCS 20 executes later stage adjustment as exemplified by the multistage fuel cell control processing according to the fourth exemplary embodiment illustrated in FIG. 11 or the multistage fuel cell control processing according to the fifth exemplary embodiment illustrated in FIG. 12. This concludes the multistage fuel cell control processing illustrated in FIG. 16.

In this manner, the multistage fuel cell system 10F according to the seventh exemplary embodiment selects the method for controlling the power generation amounts of the fuel cells in response to the load fluctuation ratio R of the load 40. This thereby enables degradation of the fuel cells of the multistage fuel cell system 10F to be suppressed in comparison to cases in which the same method is used to control the power generation amounts of the fuel cells irrespective of the load fluctuation ratio R. This also enables the load tracking response performance to be improved.

Eighth Exemplary Embodiment

In the seventh exemplary embodiment, explanation has been given regarding the multistage fuel cell system 10F that selects any one out of uniform adjustment, earlier stage adjustment, or later stage adjustment as the method for controlling the power generation amounts of the fuel cells in response to the load fluctuation ratio R. In an eighth exemplary embodiment, explanation is given regarding a multistage fuel cell system 10G that selects the method for controlling the power generation amounts of the fuel cells by comparing the degrees of degradation of the first fuel cell 11 and the second fuel cell 12.

An outline configuration of the multistage fuel cell system 10G is the same as the outline configuration of the multistage fuel cell system 10 illustrated in FIG. 1. A control system of the multistage fuel cell system 10G is the same as the control system of the multistage fuel cell system 10 illustrated in FIG. 2.

The multistage fuel cell system 10G loads and executes a program from memory into a processor, thereby enabling the computers 100, 200A, and 200B illustrated in FIG. 9 to be employed to implement functional sections relating to control of the PCS 20 and current control units 30A, 30B of the multistage fuel cell system 10G.

Explanation follows regarding output control of the fuel cells of the multistage fuel cell system 10G.

FIG. 17 is a flowchart illustrating an example of a flow of multistage fuel cell control processing based on a multistage fuel cell control program executed by the CPU 102 included in the PCS 20 of the multistage fuel cell system 10G The multistage fuel cell control program is stored in advance in the ROM 106, and the CPU 102 reads the multistage fuel cell control program from the ROM 106 and executes the multistage fuel cell control program. Here, the PCS 20 is understood to be in a state already supplying electric power generated by the fuel cells to the load 40.

First, at step S200, the PCS 20 executes similar processing to that of step S10 in FIG. 4 to acquire the electric power demand of the load 40.

At step S210, the PCS 20 executes the multistage fuel cell control processing of any one of the first exemplary embodiment to the fifth exemplary embodiment to set the current values and voltage values of the first fuel cell 11 and the second fuel cell 12.

At step S220, for example the PCS 20 calculates the absolute value of the difference (initial voltage difference) between a voltage value of the first fuel cell 11 when electric power was initially generated by the multistage fuel cell system 10G (an initial voltage value) and the voltage value of the first fuel cell 11 set at step S210. The PCS 20 also, for example, calculates the initial voltage difference between the initial voltage value of the second fuel cell 12 and the voltage value of the second fuel cell 12 set at step S210.

The respective initial voltage values of the first fuel cell 11 and the second fuel cell 12 may, for example, be stored in the RAM 104 or in a non-volatile memory.

Note that the initial voltage difference may also be calculated employing the current value of each of the fuel cells. More specifically, the voltage value of each of the fuel cells is obtained from the current value of the fuel cell as set at step S210 and from the current-voltage characteristics 60 corresponding to that fuel cell. Accordingly, the initial voltage values of the fuel cells and the voltage values of the fuel cells as calculated from the current values by referencing the current-voltage characteristics 60 can be employed to calculate the initial voltage differences.

In the following explanation, the initial voltage difference of the first fuel cell 11 is denoted the first initial voltage difference $V_{q1}$, and the initial voltage difference of the second fuel cell 12 is denoted the second initial voltage difference $V_{q2}$.

At step S230, the PCS 20 determines whether or not the first initial voltage difference $V_{q1}$ calculated at step S220 is larger than the second initial voltage difference $V_{q2}$ calculated at the same step S220. In cases in which determination is negative processing transitions to step S240.

As illustrated in FIG. 8, since there is a tendency for the current-voltage characteristics 60 to deteriorate as fuel cell degradation progresses, there is also a tendency for the voltage values of the fuel cells to decrease. Namely, the greater the initial voltage differences of the fuel cells, the more advanced fuel cell degradation may be considered.

Accordingly, in cases in which the second initial voltage difference $V_{q2}$ is the first initial voltage difference $V_{q1}$ or greater, degradation of the second fuel cell 12 may be considered more advanced than that of the first fuel cell 11. Accordingly, at step S240, the PCS 20 executes earlier stage adjustment, thereby concluding the multistage fuel cell control processing.

In cases in which the determination processing of step S230 yields affirmative determination, processing transitions to step S250.

In such cases, degradation of the first fuel cell 11 may be considered more advanced than that of the second fuel cell 12. Accordingly, at step S250, the PCS 20 executes later stage adjustment, thereby concluding the multistage fuel cell control processing.

In this manner, the multistage fuel cell system 10G according to the eighth exemplary embodiment determines the degree of degradation of the fuel cells from the initial voltage differences of the fuel cells, and varies the current value of the fuel cell that has suffered the least degradation. This enables the difference between the degrees of degradation of the fuel cells to be suppressed. This enables the first fuel cell 11 and the second fuel cell 12 to be protected at the same time, thereby improving maintenance characteristics of the multistage fuel cell system 10.

Explanation has been given regarding respective exemplary embodiments of the present disclosure. However, the scope of the present disclosure is not limited to the exemplary embodiments. Various modifications and enhancements may be made to the respective exemplary embodiments within a scope not departing from the spirit of the present disclosure, and any such modifications and enhancements are included within the technical scope of the present disclosure. For example, the processing sequence may be changed within a scope not departing from the spirit of the present disclosure.

For example, although solid oxide fuel cells are employed for the first fuel cell 11 and the second fuel cell 12 in the exemplary embodiments described above, for example molten carbonate fuel cells (MCFC) that operate at high temperatures of around 700° C., or polymer electrolyte fuel cells (PEFC) that operate at low temperatures of around 100° C. may be employed therefor. Moreover, a combination of fuel cells of different types may be employed as the earlier stage and later stage fuel cells.

Although explanation has been given in the respective exemplary embodiments regarding the multistage fuel cell system 10 configured from earlier stage and later stage fuel cells, the multistage fuel cell control processing according to the present invention may also be applied to a multistage fuel cell system including three or more stages of fuel cells.

In such cases, instead of earlier stage adjustment and later stage adjustment, the plural fuel cells may be categorized into fuel cells having a set power generation amount at a predetermined value, and fuel cells having a power generation amount controlled in response to the electric power demand of the load 40.

Although explanation has been given regarding examples in which the multistage fuel cell control processing of each multistage fuel cell system is implemented using software in the exemplary embodiments described above, processing equivalent to this multistage fuel cell control processing may be implemented using hardware in each of the exemplary embodiments. In such cases, faster processing can be achieved than in cases in which the multistage fuel cell control processing is implemented using software.

Although explanation has been given regarding examples in which the multistage fuel cell control program is stored in advance in the ROM 106, serving as an example of memory, in each of the exemplary embodiments described above, there is no limitation thereto. The multistage fuel cell control program of the present disclosure may be provided in a format recorded on a computer-readable non-transient recording medium. For example, the multistage fuel cell control program according to the present disclosure may be provided in a format recorded on an optical disc such as a compact disc (CD-ROM), or a DVD-ROM, or may be provided in a format recorded on semiconductor memory such as USB memory or flash memory. Alternatively, the multistage fuel cell system may download the multistage fuel cell control program from another electronic device connected to a communication line, and store this multistage fuel cell control program in the ROM 106.

In the exemplary embodiments described above, the PCS 20 determines current values in response to the electric power demand of the power user where the multistage fuel cell systems is installed, and notifies the current control units 30A, 30B thereof. However, for example, configuration may be made in which multistage fuel cell systems of respective power users are connected through a communication line, and current values are determined by information processing terminals connected to the communication line in response to the electric power demand of each power user, with the current control units 30A, 30B of the multistage fuel cell systems installed for each power user being notified thereof. In such cases, the power generation amounts of the first fuel cells 11 and the second fuel cells 12 can be controlled according to the load fluctuations of each power user from a remote site that is different to those where the multistage fuel cell systems are installed.

The disclosure of Japanese Patent Application No. 2017-046685, filed on Mar. 10, 2017, is incorporated in its entirety by reference herein.

The invention claimed is:

1. A fuel cell system comprising:
   a first fuel cell that generates electric power using a hydrogen-containing fuel gas;
   a second fuel cell that generates electric power using off-gas exhausted from the first fuel cell and containing hydrogen that has not reacted in the first fuel cell;
   a first control device that controls the electric power output from the first fuel cell by adjusting a current or a voltage being output from the first fuel cell;
   a second control device that controls the electric power output from the second fuel cell by adjusting a current or a voltage being output from the second fuel cell; and
   an output control device that controls at least one of the first control device or the second control device such that a total electric power being generated by the first fuel cell and the second fuel cell approaches an electric power demand.

2. The fuel cell system of claim 1, wherein the output control device references predetermined current-voltage characteristics for the first fuel cell and the second fuel cell, sets a current value or a voltage value corresponding to electric power to be generated by each of the first fuel cell and the second fuel cell, and controls the at least one of the first control device or the second control device such that the current or voltage being output from each of the first fuel cell and the second fuel cell becomes the set current value or the set voltage value.

3. The fuel cell system of claim 1, wherein the output control device calculates electric power being generated by the first fuel cell and the second fuel cell based on the current and the voltage being output from each of the first fuel cell and the second fuel cell, and controls the at least one of the first control device or the second control device such that the total of the electric power respectively calculated approaches the electric power demand.

4. The fuel cell system of claim 2, wherein the output control device controls the first control device and the second control device such that a magnitude ratio of the respective currents being output from the first fuel cell and the second fuel cell becomes a predetermined ratio.

5. The fuel cell system of claim 4, wherein the output control device controls the first control device and the second control device such that a magnitude of the current being output from the first fuel cell and a magnitude of the current being output from the second fuel cell become equal to each other.

6. The fuel cell system of claim 2, wherein the output control device controls the second control device such that the current being output from the second fuel cell does not fluctuate from a predetermined value, and controls the first control device so as to vary the current or the voltage being output from the first fuel cell such that the total electric power being generated by the first fuel cell and the second fuel cell approaches the electric power demand.

7. The fuel cell system of claim 2, wherein the output control device controls the first control device such that the current being output from the first fuel cell does not fluctuate from a predetermined value, and controls the second control device so as to vary the current or voltage being output from the second fuel cell such that the total electric power being generated by the first fuel cell and the second fuel cell approaches the electric power demand.

8. The fuel cell system of claim 2, wherein the output control device selects at least one of the first fuel cell or the second fuel cell as a fuel cell subjected to current control according to a level of fluctuation in the electric power demand, and controls the at least one of the first fuel cell or the second fuel cell so as to vary the current or voltage being output from the selected fuel cell such that the total electric power being generated by the first fuel cell and the second fuel cell approaches the electric power demand.

9. The fuel cell system of claim 2, wherein the output control device selects a fuel cell of the first fuel cell or the second fuel cell that has a lower degree of degradation, and controls the selected fuel cell so as to vary the current or voltage being output from the selected fuel cell such that the total electric power being generated by the first fuel cell and the second fuel cell approaches the electric power demand.

10. A fuel cell system comprising:
a first fuel cell that generates electric power using a hydrogen-containing fuel gas;
a second fuel cell that generates electric power using off-gas exhausted from the first fuel cell and containing hydrogen that has not reacted in the first fuel cell;
a control device that controls electric power output from the first fuel cell and the second fuel cell by adjusting a current or a voltage being output from the first fuel cell and the second fuel cell with the first fuel cell and the second fuel cell connected together in series; and
an output control device that controls the control device such that a total electric power being generated by the first fuel cell and the second fuel cell approaches an electric power demand.

11. The fuel cell system of claim 10, wherein the output control device references predetermined current-voltage characteristics for the first fuel cell and the second fuel cell, sets either a current value or a voltage value corresponding to electric power to be generated by each of the first fuel cell and the second fuel cell, and controls the control device such that the current or voltage being output from each of the first fuel cell and the second fuel cell becomes the set current value or the set voltage value.

12. The fuel cell system of claim 10, wherein the output control device calculates an electric power being generated by each of the first fuel cell and the second fuel cell based on the current and the voltage being output from each of the first fuel cell and the second fuel cell, and controls the control device such that the total electric power respectively calculated approaches the electric power demand.

13. A non-transitory recording medium that stores a fuel cell control program configured to cause a computer to execute processing, the processing comprising:
controlling electric power being output from a first fuel cell that generates electric power using a hydrogen-containing fuel gas by adjusting a current or a voltage being output from the first fuel cell;
controlling electric power output from a second fuel cell that generates electric power using off-gas exhausted from the first fuel cell and containing hydrogen that has not reacted in the first fuel cell by adjusting a current or a voltage being output from the second fuel cell; and
controlling such that a total electric power being generated by the first fuel cell and the second fuel cell approaches an electric power demand.

14. A non-transitory recording medium that stores a fuel cell control program configured to cause a computer to effect processing, the processing comprising:
controlling electric power output from a first fuel cell that generates electric power using a hydrogen-containing fuel gas and controlling electric power output from a second fuel cell that is electrically connected in series with the first fuel cell and that generates electric power using off-gas exhausted from the first fuel cell and containing hydrogen that has not reacted in the first fuel cell, the electric power output from the first fuel cell and the second fuel cell being controlled by adjusting a current or a voltage output from the first fuel cell and the second fuel cell; and
controlling such that a total electric power being generated by the first fuel cell and the second fuel cell approaches an electric power demand.

* * * * *